United States Patent
Nagatomo et al.

(10) Patent No.: US 7,154,890 B2
(45) Date of Patent: Dec. 26, 2006

(54) PACKET TRANSFER DEVICE, SEMICONDUCTOR DEVICE, AND PACKET TRANSFER SYSTEM

(75) Inventors: Teruhiko Nagatomo, Kanagawa (JP); Kazuya Asano, Kanagawa (JP); Junichi Hashida, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1026 days.

(21) Appl. No.: 10/079,405

(22) Filed: Feb. 22, 2002

(65) Prior Publication Data

US 2002/0159459 A1  Oct. 31, 2002

(30) Foreign Application Priority Data

Apr. 27, 2001 (JP) .............................. 2001-132253
Oct. 5, 2001 (JP) .............................. 2001-310116

(51) Int. Cl.
*H04L 12/56* (2006.01)
(52) U.S. Cl. ...................... 370/392; 370/401; 370/419; 370/469; 370/474
(58) Field of Classification Search ..................... None
See application file for complete search history.

(56) References Cited

U.S. PATENT DOCUMENTS

| 6,115,378 | A * | 9/2000 | Hendel et al. ............... 370/392 |
| 6,704,974 | B1 * | 3/2004 | Lackler ......................... 24/350 |
| 6,791,947 | B1 * | 9/2004 | Oskouy et al. ............. 370/238 |
| 2001/0053150 | A1 * | 12/2001 | Clear et al. .................. 370/392 |
| 2002/0085560 | A1 * | 7/2002 | Cathey et al. .............. 370/392 |

FOREIGN PATENT DOCUMENTS

| JP | 2000-032052 | 1/2000 |
| JP | 2000-253047 | 9/2000 |
| JP | 2001-77857 | 3/2001 |

OTHER PUBLICATIONS

"Advice for Using Multilayer Switching," Computer & Network LAN, Ohmsha, vol. 17, No. 6, Jun. 1999, pp. 2-6.
Japanese Office Action dated Jun. 6, 2006 of Application No. JP 2001-310116.

* cited by examiner

*Primary Examiner*—Chi Pham
*Assistant Examiner*—Justin M. Philpott
(74) *Attorney, Agent, or Firm*—Staas & Halsey LLP

(57) ABSTRACT

A packet transfer device has a layer 2 switch and performs switching by referring to header information of a 3rd layer and higher layers. Input/output ports receives packets from and transmits packets to other devices connected to the packet transfer device. A header information extracting circuit extracts header information belonging to a 3rd layer (network layer) and higher layers of a network protocol from packets inputted from the respective input/output ports. A table stores header information and control information corresponding to the header information in association with each other. A control information acquiring circuit acquires control information corresponding to the header information extracted by the header information extracting circuit from the table. A processing circuit processes packets based on the control information acquired by the control information acquiring circuit.

13 Claims, 30 Drawing Sheets

| REFERENCE FIELD | | | DATA FIELD | |
| --- | --- | --- | --- | --- |
| SOURCE IP ADDRESS | DESTINATION IP ADDRESS | SOURCE TCP PORT NUMBER | DESTINATION TCP PORT NUMBER | INPUT/OUTPUT PORT | FILTERING |
| SA#1 | DA#1 | SP#1 | DP#1 | P#1 | NO |
| SA#2 | DA#2 | SP#2 | DP#2 | P#2 | NO |
| SA#3 | DA#3 | SP#3 | DP#3 | — | YES |

FIG. 6

| RECEPTION INPUT/OUTPUT PORT | SOURCE IP ADDRESS | DESTINATION IP ADDRESS | SOURCE TCP PORT NUMBER | DESTINATION TCP PORT NUMBER | INPUT/OUTPUT PORT | FILTERING |
|---|---|---|---|---|---|---|
| PORT 11 | gaany | ga#1 | tcpany | 80 | CPU | NO |
| PORT 11 | gaany | ga#1 | tcpany | 100 | — | YES |
| ... | ... | ... | ... | ... | ... | ... |

Reference field: columns 1–5. Data field: columns 6–7.

FIG. 7

| | DESTINATION MAC ADDRESS | SOURCE MAC ADDRESS | SOURCE IP ADDRESS | DESTINATION IP ADDRESS | SOURCE TCP PORT NUMBER | DESTINATION TCP PORT NUMBER |
|---|---|---|---|---|---|---|
| PACKET #1 | ma#1 | max | gax | ga#1 | x | 80 |
| PACKET #2 | ma#1 | max | gax | ga#1 | x | 100 |
| ... | ... | ... | ... | ... | ... | ... |

FIG. 8

| | REFERENCE FIELD | | | DATA FIELD | |
|---|---|---|---|---|---|
| SOURCE IP ADDRESS | DESTINATION IP ADDRESS | SOURCE TCP PORT NUMBER | DESTINATION TCP PORT NUMBER | INPUT/OUTPUT PORT | FILTERING |
| pa#1 | pa#2 | tcpany | 110 | PORT 13 | NO |
| pa#1 | pa#2 | tcpany | 100 | — | YES |
| ... | ... | ... | ... | ... | ... |

FIG. 10

|  | DESTINATION MAC ADDRESS | SOURCE MAC ADDRESS | SOURCE IP ADDRESS | DESTINATION IP ADDRESS | SOURCE TCP PORT NUMBER | DESTINATION TCP PORT NUMBER |
|---|---|---|---|---|---|---|
| PACKET #1 | mpa#2 | mpa#1 | pa#1 | pa#2 | x | 110 |
| PACKET #2 | mpa#2 | mpa#1 | pa#1 | pa#2 | x | 100 |
| ... | ... | ... | ... | ... | ... | ... |

FIG. 11

| REFERENCE FIELD | | DATA FIELD | |
|---|---|---|---|
| SOURCE IP ADDRESS | DESTINATION IP ADDRESS | INPUT/OUTPUT PORT | FILTERING |
| pa#4 | pa#1 | PORT 12, 13 | NO |
| pa#4 | pa#2 | PORT 13 | YES |
| . . . | . . . | . . . | . . . |

FIG. 12

| | REFERENCE FIELD | | | DATA FIELD | |
|---|---|---|---|---|---|
| SOURCE IP ADDRESS | DESTINATION IP ADDRESS | SOURCE TCP PORT NUMBER | DESTINATION TCP PORT NUMBER | INPUT/OUTPUT PORT | FILTERING |
| pa#4 | pa#1 | × | 110 | PORT 13 | NO |
| pa#4 | pa#2 | × | 100 | PORT 13 | NO |
| ... | ... | ... | ... | ... | ... |

FIG. 13

| | DESTINATION MAC ADDRESS | SOURCE MAC ADDRESS | SOURCE IP ADDRESS | DESTINATION IP ADDRESS | SOURCE TCP PORT NUMBER | DESTINATION TCP PORT NUMBER |
|---|---|---|---|---|---|---|
| PACKET #1 | ma#1 | ma#2 | pa#4 | pa#1 | x | 110 |
| PACKET #2 | ma#1 | ma#2 | pa#4 | pa#2 | x | 100 |
| ... | ... | ... | ... | ... | ... | ... |

FIG. 14

| REFERENCE FIELD | DATA FILED |
|---|---|
| IP ADDRESS #1 | PORT 11 |
| IP ADDRESS #2 | PORT 12 |
| IP ADDRESS #3 | PORT 13 |

FIG. 15 (A)

| REFERENCE FIELD | DATA FIELD |
|---|---|
| TCP PORT #1 | PORT 11 |
| TCP PORT #2 | PORT 12 |
| TCP PORT #3 | PORT 13 |

FIG. 15 (B)

| REFERENCE FIELD | | | | DATA FIELD | |
| --- | --- | --- | --- | --- | --- |
| SOURCE IP ADDRESS | DESTINATION IP ADDRESS | SOURCE TCP PORT NUMBER | DESTINATION TCP PORT NUMBER | INPUT/OUTPUT PORT | PRIORITY |
| SA#1 | DA#1 | SP#1 | DP#1 | P#1 | PRIORITY #1 |
| SA#2 | DA#2 | SP#2 | DP#2 | P#2 | PRIORITY #2 |
| SA#3 | DA#3 | SP#3 | DP#3 | — | — |

FIG. 19

| | REFERENCE FIELD | | | DATA FIELD | |
|---|---|---|---|---|---|
| SOURCE IP ADDRESS | DESTINATION IP ADDRESS | SOURCE TCP PORT NUMBER | DESTINATION TCP PORT NUMBER | INPUT/OUTPUT PORT | PRIORITY |
| any | pa#2 | 6000 | 6300 | PORT 12 | PRIORITY HIGH |
| any | pa#2 | any | 100 | PORT 12 | PRIORITY LOW |
| ... | ... | ... | ... | ... | ... |

FIG. 20

| | DESTINATION MAC ADDRESS | SOURCE MAC ADDRESS | SOURCE IP ADDRESS | DESTINATION IP ADDRESS | SOURCE TCP PORT NUMBER | DESTINATION TCP PORT NUMBER |
|---|---|---|---|---|---|---|
| PACKET #1 | ma#2 | ma#1 | pa#1 | pa#2 | 6000 | 6300 |
| PACKET #2 | ma#2 | ma#3 | pa#3 | pa#2 | x | 100 |
| ... | ... | ... | ... | ... | ... | ... |

FIG. 21

| No. | CONTROL BITS | SOURCE IP ADDRESS | DESTINATION IP ADDRESS | SOURCE TCP PORT NUMBER | DESTINATION TCP PORT NUMBER | TOS | PRIORITY: PORT |
|---|---|---|---|---|---|---|---|
| 1 | 10001 | pa#0 | pa#3 | — | — | 000 | LOW:PORT 12 |
| 2 | 10001 | pa#1 | pa#3 | — | — | 100 | HIGH:PORT 12 |
| 3 | 10001 | pa#2 | pa#3 | — | — | 010 | MEDIUM:PORT 12 |
| ... | ... | ... | ... | ... | ... | ... | ... |

FIG. 23

| | DESTINATION MAC ADDRESS | SOURCE MAC ADDRESS | SOURCE IP ADDRESS | DESTINATION IP ADDRESS | TOS VALUE |
|---|---|---|---|---|---|
| PACKET #1 | ma#3 | ma#0 | pa#0 | pa#3 | 000 |
| PACKET #2 | ma#3 | ma#1 | pa#1 | pa#3 | 100 |
| PACKET #3 | ma#3 | ma#2 | pa#2 | pa#3 | 010 |
| ... | ... | ... | ... | ... | ... |

FIG. 24

| REFERENCE FIELD | DATA FIELD |
|---|---|
| MAC ADDRESS #1 | PORT NUMBER #1 |
| MAC ADDRESS #2 | PORT NUMBER #2 |
| MAC ADDRESS #3 | PORT NUMBER #3 |

PRIOR ART
FIG. 30

PACKET TRANSFER DEVICE, SEMICONDUCTOR DEVICE, AND PACKET TRANSFER SYSTEM

BACKGROUND OF THE INVENTION (1) Field of the Invention

The present invention relates to a packet transfer device and a semiconductor device, and more particularly to a packet transfer device, a semiconductor device, and a packet transfer system for transferring packets inputted from a plurality of input/output ports to corresponding input/output ports.

(2) Description of the Related Art

The growing popularity among many people of the Internet in recent years had led to the increasing use of access routers in home and SOHO (Small Office Home Office) environments.

Access routers that are mainly used at present are called "ISDN (Integrated Service Digital Network) router". Generally, access routers have an interface having a frequency band of 64 Kbps for the WAN (Wide Area Network) side for accessing the Internet and a plurality of Ethernet interfaces having a frequency band of 10 Mbps for the home or SOHO side.

Communication services called broadband services including CATV (Cable Television), ADSL (Asymmetric Digital Subscriber Line), and FTTH (Fiber to The Home) have been emerged in recent years. These services have a WAN frequency band of 1 Mbps or higher, and some of them even have a side WAN frequency band of 100 Mbps. There is a possibility that there will be a demand for home or SOHO frequency bands in the range of 100 Mbps to meet the need for receiving and transmitting multimedia data.

FIG. 28 of the accompanying drawings shows a conventional access router by way of example.

As shown in FIG. 28, the conventional access router comprises a layer 2 (data link layer) switch 10 and a CPU (Central Processing Unit) 20.

The layer 2 switch 10 comprises a plurality of input/output ports 11 through 13, a plurality of MAC (Media Access Control) blocks (referred to as "processing circuits") 14 through 16, a switch block 17, and a reference block 18.

The input/output ports 11 through 13 are connected to a WAN or a host for transmitting information thereto and receiving information therefrom.

The processing circuits 14 through 16 extract destination MAC addresses from packets that have been received by the input/output ports 11 through 13, supply the extracted destination MAC addresses to the reference block 18, and identify input/output ports from which to output data. The processing circuits 14 through 16 then supply the packets to the switch block 17 and output the packets from the identified input/output ports.

FIG. 29(A) of the accompanying drawings shows a detail structure of the processing circuit 14. As shown in FIG. 29(A), the processing circuit 14 comprises a reference block interface 14a, a switch block interface 14b, and a header information extractor 14c.

The reference block interface 14a is an interface for connection to the reference block 18.

The switch block interface 14b is an interface for connection to the switch block 17.

The header information extractor 14c is a circuit for extracting header information (destination MAC address) from a packet.

Since the processing circuits 14 through 16 are structurally identical to each other, the processing circuits 15, 16 will not be described in detail below.

In FIG. 28, the reference block 18 identifies input/output ports from which to output data based on destination MAC addresses supplied from the processing circuits 14 through 16.

FIG. 29(B) of the accompanying drawings shows a detail structure of the reference block 18. As shown in FIG. 29(B), the reference block 18 comprises a reference table 18a and a comparator 18b.

The reference table 18a is made up of a reference field and a data field. The reference field stores destination MAC addresses, and the data field stores the port numbers of corresponding input/output ports.

The comparator 18b compares a destination MAC address supplied from a requesting one of the processing circuits 14 through 16 with the destination MAC addresses stored in the reference field of the reference table 18a. If there is a matching destination MAC address, then the comparator 18b acquires a corresponding port number as control information from the data field of the reference table 18a, and supplies the acquired port number to the requesting processing circuit.

The CPU 20 changes the header of packets and recalculates CRC (Cyclic Redundancy Check) codes when it performs a routing process.

Operation of the above conventional access router will be described below. It is assumed that the input/output port 11 has a port number #1 and the input/output ports 12, 13 have respective port numbers #2, #3, and that the input/output ports 11, 12 are connected to respective hosts and the input/output port 13 is connected to the WAN.

The host connected to the input/output port 11 transmits a packet toward the host connected to the input/output port 12.

The input/output port 11 receives the packet transmitted from the host and supplies the received packet to the processing circuit 14.

The header information extractor 14c of the processing circuit 14 extracts a destination MAC address from the packet. In this example, the header information extractor 14c acquires the MAC address #2 which is the MAC address of the host connected to the input/output port 12.

The MAC address #2 thus acquired is supplied via the reference block interface 14a to the reference block 18.

The comparator 18b of the reference block 18 compares the acquired MAC address #2 with the MAC addresses stored in the reference field of the reference table 18a. Since the acquired MAC address #2 matches the second item in the reference field, the comparator 18b acquires the corresponding port number #2 and supplies the port number #2 to the requesting processing circuit 14.

The processing circuit 14 acquires the port number #2 via the reference block interface 14a, and supplies the acquired port number #2 together with the packet to the switch block 17 via the switch block interface 14b.

The switch block 17 temporarily stores the supplied packet in its buffer, and then supplies the packet to the processing circuit 15 corresponding to the identified port number #2.

The switch block interface of the processing circuit 15 receives the packet supplied from the switch block 17, and supplies the received packet to the host via the input/output port 12.

Packets can thus be transferred between hosts according to the above process.

With the conventional access router shown in FIG. 28, the layer 2 switch 10 which is hardware-implemented can process a level of information which literally belongs to the layer 2. In order for the conventional access router to be able to perform other processes involving high-level decision making steps (e.g., a filtering process), the CPU 20 needs to take part in sharing the operation.

The recent increase in the communication rate tends to impose a greater load on the CPU 20. As a result, when the CPU 20 performs a high-level process, the CPU 20 is overloaded and sometimes fails to carry out the process, often losing packets which are to be transferred.

Access routers are desired to reliably keep response times and throughputs required by respective communication sessions for increased QoS (Quality of Service) by assigning optimum frequency bands depending on the purpose of the communication sessions.

In order to achieve a desired level of QoS with a layer 2 switch, it has been customary for the switch to process successive packets based on identifiers indicative of priority which are contained in packet headers in the data link layers according to the IEEE 802.1 p/Q. However, it is difficult to apply a policy of unified application levels because each application manages packet priority with a TOS field in the IP packet header and a port number in the TCP/UDP header when it determines the priority ranking of a packet. These items of information correspond to information of 3rd and 4th layers of an OSI 7-layer model. It depends on the skill of the network administrator to determine how to map these items of information onto the layer 2. Specifically, the network administrator may rank application priorities in a manner not intended by the applications, or may leave application priorities as set by default, so that the application priorities will not be reflected in the 2nd layer (data link layer).

If priorities can be set in the application level based on the information contained in the 3rd and 4th layers, then unified priorities can be set for packets from any terminals where any applications are installed. Specifically, it is possible to specify flow-based priorities based on a combination of destination IP address, source IP address, destination TCP/UDP port number, and source TCP/UDP port number. However, since the conventional layer 2 switch cannot refer to these items of information, the above scheme is not applicable to the conventional layer 2 switch.

If the above functions are to be software-implemented by the CPU, then the CPU is required to process all the packets received from all the interfaces. In reality, however, the CPU does not have a sufficient processing ability to process all the packets received from all the interfaces.

SUMMARY OF THE INVENTION

It is therefore an object of the present invention to provide a packet transfer device and a semiconductor device which are capable of performing high-level processes without imposing an increased burden on a central control unit such as a CPU or the like and also of handling data at increased communication rates.

Another object of the present invention is to provide a packet transfer device and a semiconductor device which are capable of improving QoS without imposing an increased burden on a central control unit such as a CPU or the like.

To achieve the above objects, there is provided in accordance with the present invention a packet transfer device having a plurality of input/output ports, a header information extracting circuit for extracting header information belonging to a 3rd layer (network layer) and higher layers of a network protocol from packets inputted from the respective input/output ports, a table storing header information and control information corresponding to the header information in association with each other, a control information acquiring circuit for acquiring control information corresponding to the header information extracted by the header information extracting circuit from the table, and a processing circuit for processing packets based on the control information acquired by the control information acquiring circuit.

To achieve the above objects, there is also provided a semiconductor device having a plurality of input/output ports, a header information extracting circuit for extracting header information belonging to a 3rd layer (network layer) and higher layers of a network protocol from packets inputted from the respective input/output ports, a table storing header information and control information corresponding to the header information in association with each other, a control information acquiring circuit for acquiring control information corresponding to the header information extracted by the header information extracting circuit from the table, and a processing circuit for processing packets based on the control information acquired by the control information acquiring circuit.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram showing data stored in a reference table;

FIG. 7 is a diagram showing data stored in a reference table;

FIG. 8 is a diagram showing header information contained in packets;

FIG. 10 is a diagram showing data stored in a reference table;

FIG. 11 is a diagram showing header information contained in packets;

FIG. 12 is a diagram showing data stored in a reference table;

FIG. 13 is a diagram showing data stored in a reference table;

FIG. 14 is a diagram showing header information contained in packets;

FIGS. 15(A) and 15(B) are diagrams showing data stored in reference tables;

FIG. 19 is a diagram showing data stored in a table shown in FIG. 17;

FIG. 20 is a diagram showing specific data stored in the table shown in FIG. 17;

FIG. 21 is a diagram showing specific data stored in the table shown in FIG. 17;

FIG. 23 is a diagram showing data stored in a table shown in FIG. 22;

FIG. 24 is a diagram showing packets inputted to the packet transfer device shown in FIG. 22;

FIG. 30 is a diagram showing data stored in a reference table shown in FIG. 29.

DESCRIPTION OF THE PREFERRED EMBODIMENTS

Figure 1:
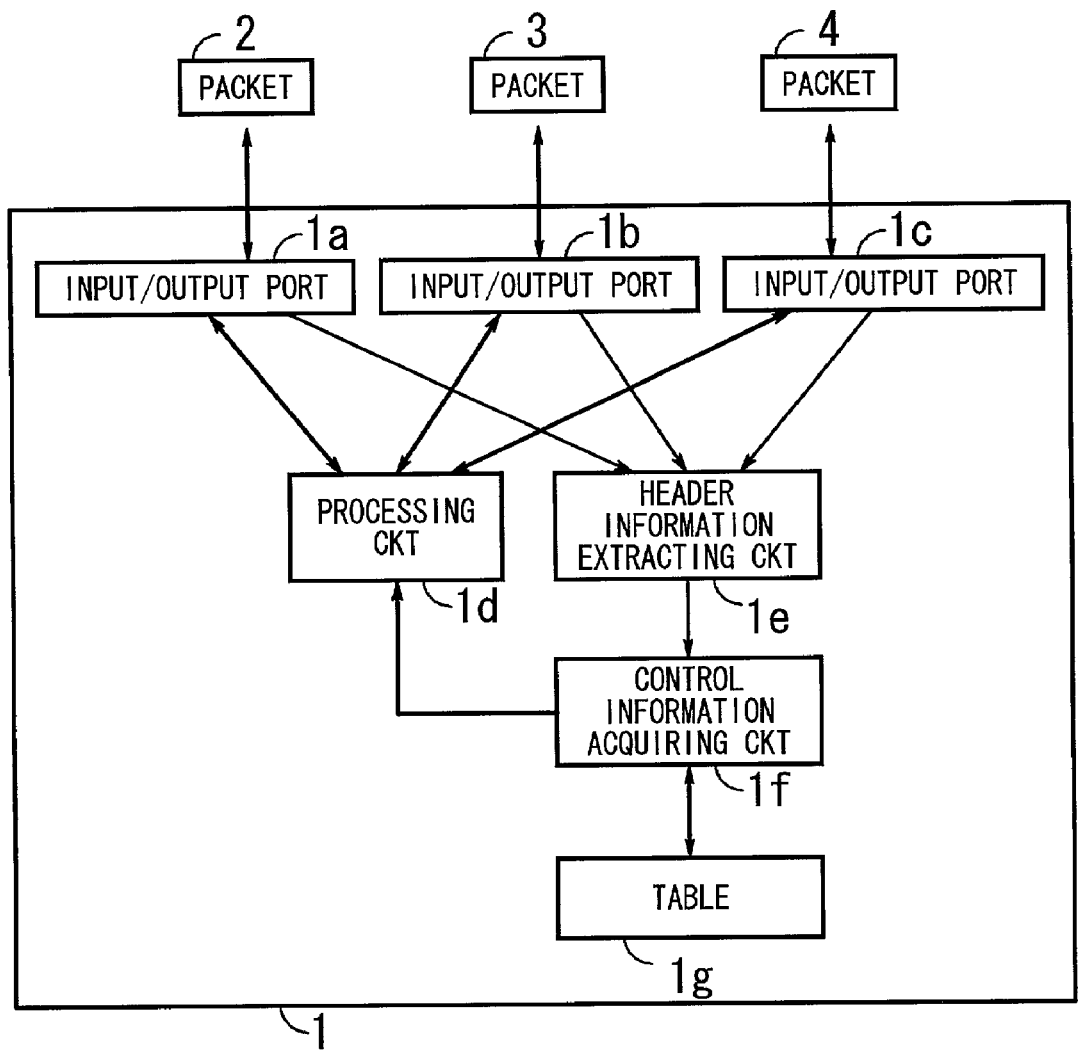
FIG. 1 is a block diagram showing the principles of operation of the present invention.

FIG. 1 shows the principles of operation of the present invention. As shown in FIG. 1, a packet transfer device 1 according to the present invention comprises a plurality of input/output ports 1a through 1c, a processing circuit 1d, a header information extractor 1e, a control information acquisition circuit 1f, and a table 1g.

The input/output ports 1a through 1c receives packets from and transmits packets to external devices connected thereto.

The header information extractor 1e extracts header information belonging to a 2nd layer (data link layer), a 3rd layer (network layer), and higher layers of a network protocol from packets inputted from the input/output ports 1a through 1c.

The table 1g stores header information and control information corresponding to the header information in association with each other.

The control information acquisition circuit 1f acquires control information corresponding to the header information extracted by the header information extractor 1e from the table 1g.

The processing circuit 1d processes the packets according to the control information acquired by the control information acquisition circuit 1f.

Operation of the packet transfer device 1 according to the principles of the present invention will be described below.

It is assumed that the input/output port 1a is connected to a WAN, the input/output port 1b to a WEB server, and the input/output port 1c to a client.

The WEB server is occasionally desired to inhibit access to TCP port numbers other than certain TCP port numbers. Such an example will be described below.

It is assumed that a packet 2 is inputted from the input/output port 1a. The packet 2 is destined for the WEB server connected to the input/output port 1b and includes a port number to which access is inhibited as a destination TCP port number.

The packet 2 inputted from the input/output port 1a is supplied to the header information extractor 1e, which extracts the header from the packet 2. In this example, the header information extractor 1e extracts a TCP header belonging to a 4th layer, and supplies the extracted TCP header to the control information acquisition circuit 1f.

The control information acquisition circuit 1f acquires control information corresponding to the header information extracted by the header information extractor 1e from the table 1g.

The table 1g stores TCP headers belonging to the 4th layer and control information in association with each other. The table 1g returns control information corresponding to the header information supplied from the header information extractor 1e to the control information acquisition circuit 1f.

Since the packet 2 includes a TCP port number to which access is inhibited in this example, the control information acquired from the table 1g indicates that the packet be filtered (discarded).

The control information is supplied from the control information acquisition circuit 1f to the processing circuit 1d. Based on the control information from the control information acquisition circuit 1f, the processing circuit 1d discards the packet 2 inputted from the input/output port 1a without supplying it to the input/output port 1b which is specified as an output destination.

According to the above process, it is possible to filter packets based on information belonging to the 4th layer of the network.

An embodiment of the present invention will be described below with reference to FIG. 2.

Figure 2:
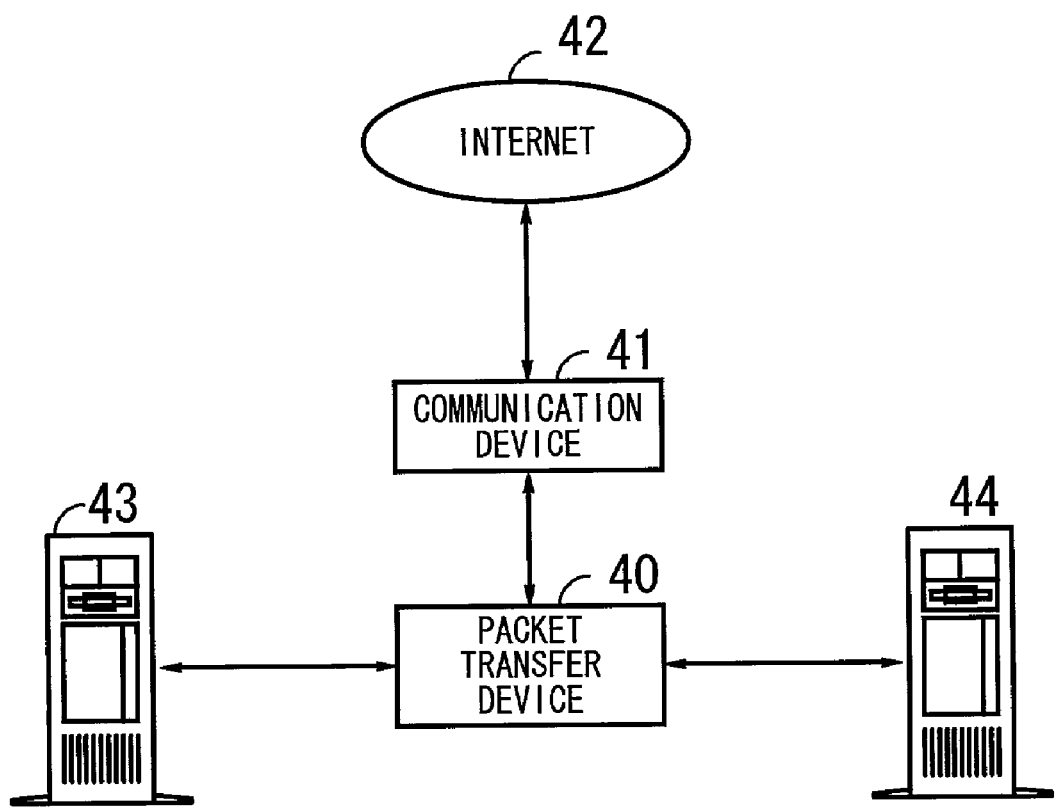
FIG. 2 is a block diagram of a system incorporating a packet transfer device according to a first embodiment of the present invention.

FIG. 2 shows in block form a system incorporating a packet transfer device according to a first embodiment of the present invention. As shown in FIG. 2, a packet transfer device 40 is connected to the Internet 42 by a communication device 41 and also connected to hosts 43, 44.

The packet transfer device 40 transmits information to and received information from the hosts 43, 44 and other hosts connected to the Internet 42.

The communication device 41 comprises a modem or the like. When the packet transfer device 40 is connected to the Internet 42 via a public network, the communication device 41 converts digital data from the packet transfer device 40 into analog data, and also converts an analog signal from the public network into a digital signal.

Each of the hosts 43, 44 comprises a WEB server and a POP server, for example.

Figure 3:
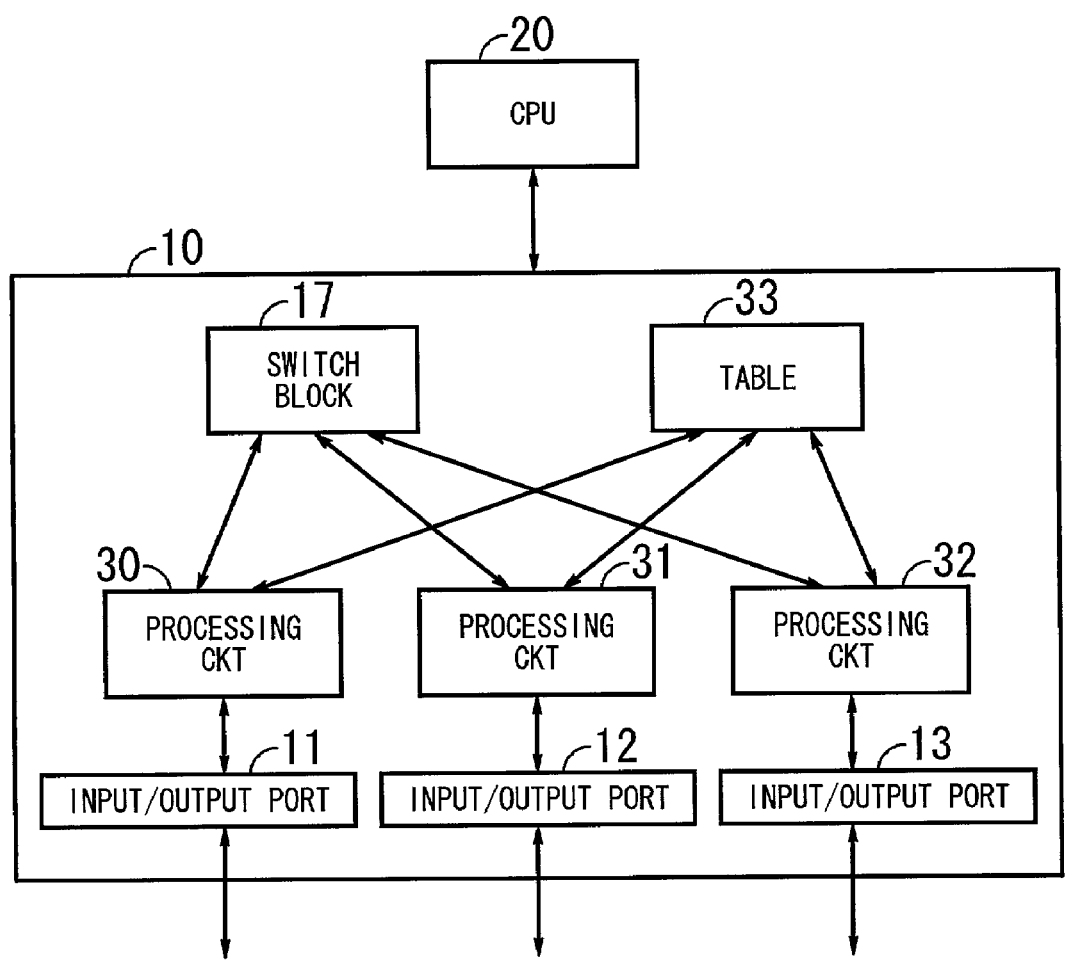
FIG. 3 is a block diagram showing a detailed structure of the packet transfer device shown in FIG. 2.

FIG. 3 shows in block form a detailed structure of the packet transfer device 40.

As shown in FIG. 3, the packet transfer device 40 comprises a layer 2 switch 10 and a CPU 20.

The layer 2 switch 10 comprises a plurality of input/output ports 11 through 13, a plurality of processing circuits 30 through 32, a switch block 17, and a table 33.

The input/output ports 11 through 13 are connected to the communication device 41, the hosts 43, 44 and transmits packets thereto and received packets therefrom.

Figure 28:
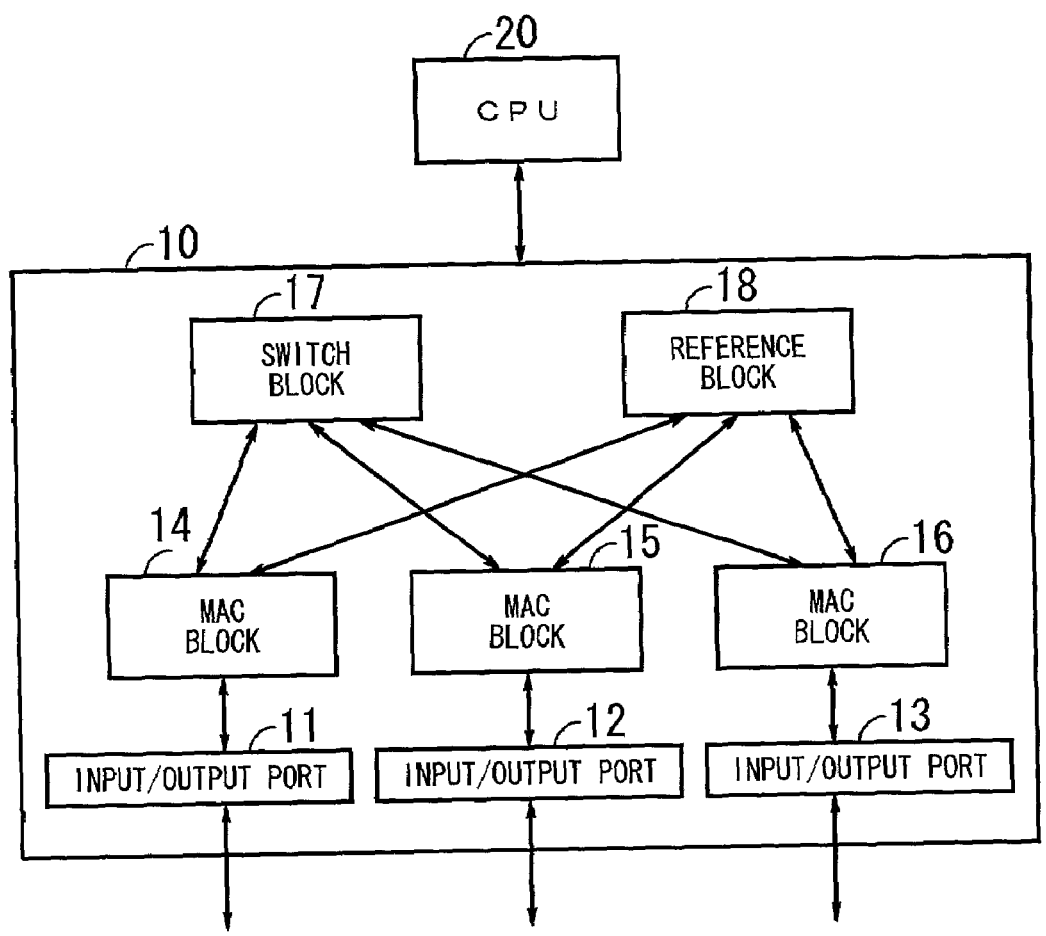
FIG. 28 is a block diagram of a conventional access router.
Figure 29A:
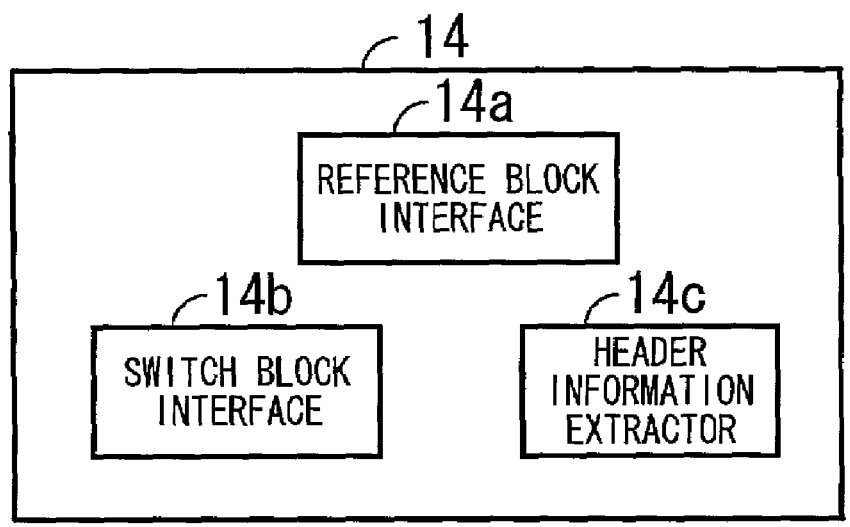
FIGS. 29(A) and 29(B) are detail structures of a reference block and a processing circuit, respectively, shown in FIG. 28.
Figure 29B:
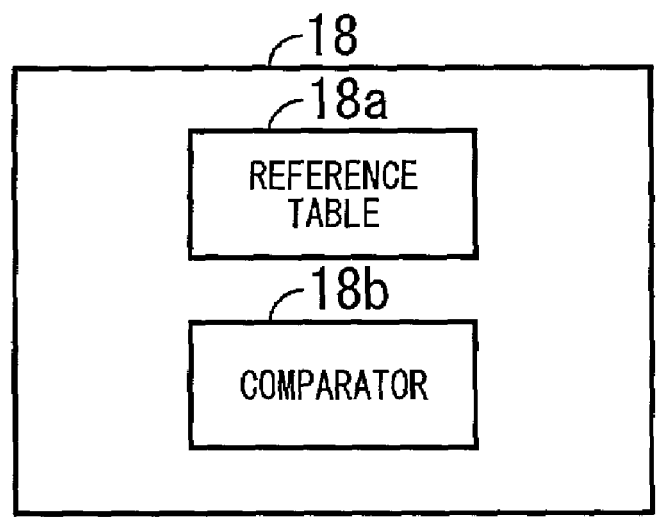

The processing circuits 30 through 32 (corresponding to the MAC blocks in FIG. 28) extract header information belonging to layers 2 through 4, which includes destination MAC addresses, IP addresses, and TCP port numbers, from packets received by the input/output ports 11 through 13, supply the extracted header information to the table 33, and receive an indication of what process is to be effected on the packets.

Figure 4A:
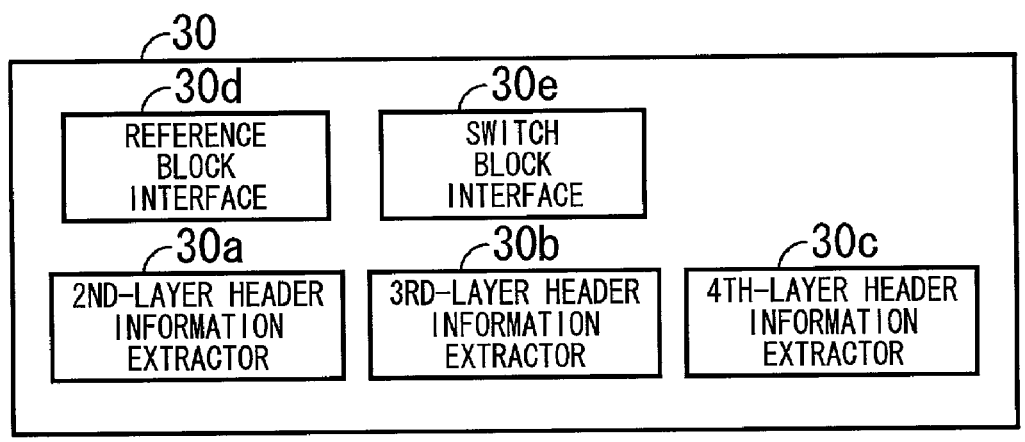
FIG. 4(A) is a block diagram showing a detailed structure of a processing circuit shown in FIG. 3.

FIG. 4(A) shows in block form a detailed structure of the processing circuit 30. As shown in FIG. 4(A), the processing circuit 30 comprises a 2nd-layer header information extractor 30a, a 3rd-layer header information extractor 30b, a 4th-layer header information extractor 30c, a reference block interface 30d, and a switch block interface 30e.

The 2nd-layer header information extractor 30a extracts 2nd-layer header information from a packet supplied from the input/output port 11.

The 3rd-layer header information extractor 30b extracts 3rd-layer header information from a packet supplied from the input/output port 11.

The 4th-layer header information extractor 30c extracts 4th-layer header information from a packet supplied from the input/output port 11.

The reference block interface 30d is an interface for connection to the table 33.

The switch block interface 30e is an interface for connection to the switch block 17.

Since the processing circuits 30 through 32 are structurally identical to each other, the processing circuits 31, 32 will not be described in detail below.

The table 33 (corresponding to the reference block 18 shown in FIG. 28) determines how to process packets in question based on the 2nd through 4th header information supplied from the respective processing circuits 30 through 32.

Figure 4B:
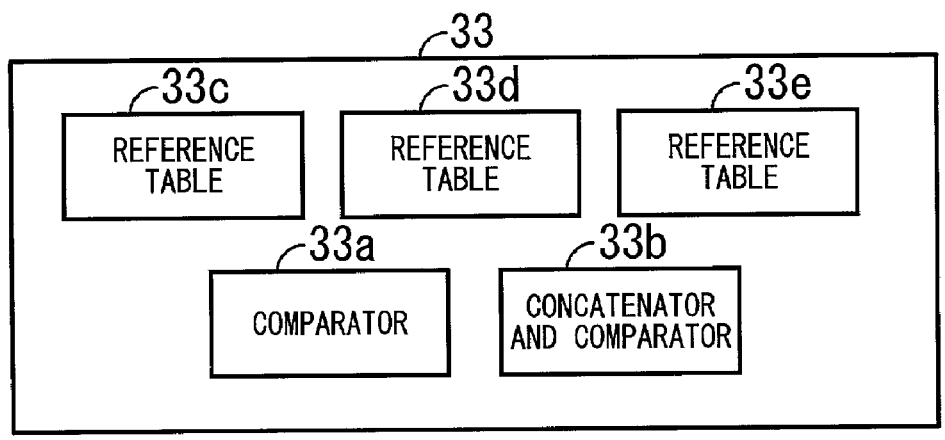
FIG. 4(B) is a block diagram showing a detailed structure of a table shown in FIG. 3.

FIG. 4(B) shows in block form a detailed structure of the table 33. As shown in FIG. 4(B), the table 33 comprises a comparator 33a, a concatenator and comparator 33b, and a plurality of reference tables 33c through 33e.

The comparator 33a compares single header information supplied from each of the processing circuits 30 through 32 with data in a reference field in a reference table. If there is corresponding data in the reference field, then the comparator 33a acquires control information from a data field in the reference table, and supplies the acquired control information to the requesting processing circuit.

Figure 5:
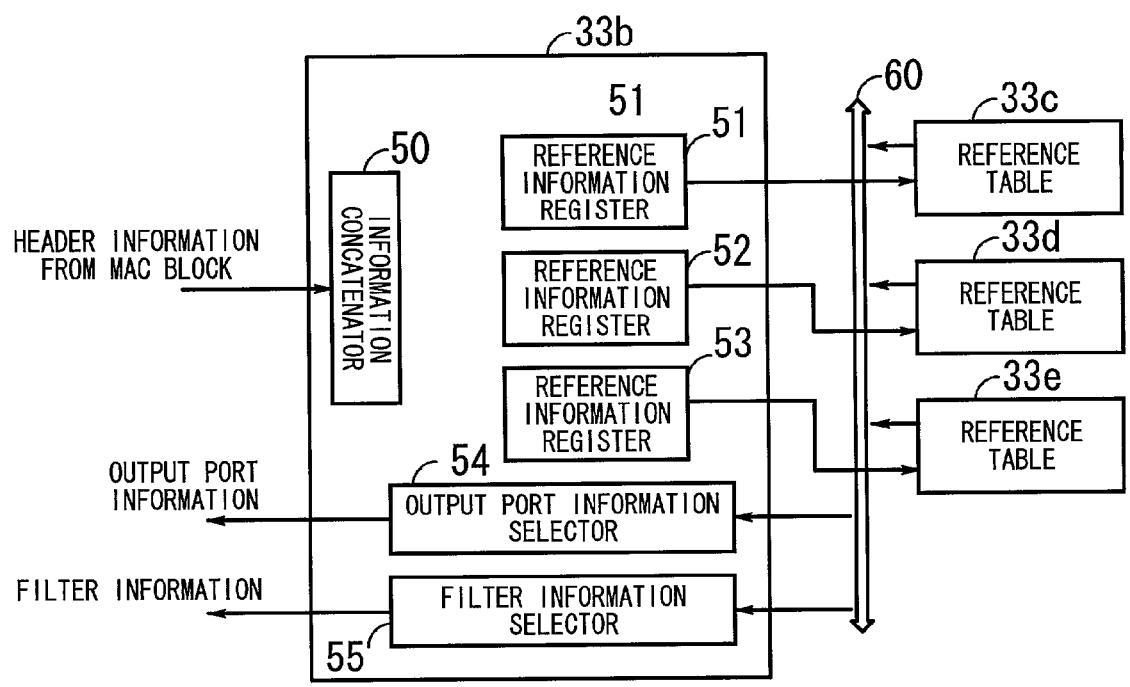
FIG. 5 is a block diagram showing a detailed structure of a concatenator and comparator shown in FIG. 4(B)

FIG. 5 shows in block form a detailed structure of the concatenator and comparator 33b. As shown in FIG. 5, the concatenator and comparator 33b comprises an information concatenator 50, a plurality of reference information registers 51 through 53, an output port information selector 54, and a filter information selector 55.

The information concatenator 50 concatenates header information (header information of the 2nd through 4th layers) supplied from the respective processing circuits 30 through 32 depending on the reference tables 33c through 33e, and outputs the concatenated header information to the reference information registers 51 through 53.

The reference information registers 51 through 53 acquires the header information concatenated by the information concatenator 50, temporarily stores the acquired header information, and supplies the stored header information to the reference tables 33c through 33e.

The output port information selector 54 acquires output port information representing an output port from the control information which has been supplied from the reference tables 33c through 33e via a bus 60. If there are a plurality of items of output port information, then the output port information selector 54 selects output port information corresponding to a table containing header information of the highest layer, and supplies the selected output port information to the requesting processing circuit.

The filter information selector 55 acquires filter information indicative of whether there is a filtering process or not from the control information which has been supplied from the reference tables 33c through 33e via the bus 60. If there is a plurality of items of filter information and if either one of the items of filter information represents the presence of a filtering process, then the filter information selector 55 sends a message indicating that the filtering process is necessary to the requesting processing circuit.

As shown in FIG. 6, each of the reference tables 33c through 33e comprises a reference field and a data field. The reference field stores combinations of header information belonging to the 2nd through 4th layers. In the example shown in FIG. 6, the reference field stores source IP addresses and destination IP addresses belonging to the 3rd layer and source TCP port numbers and destination TCP port numbers belonging to the 4th layer.

The data field stores input/output port information specifying ports from which to output data and to which input data, and filter information indicative of whether there is a filtering process or not.

Specifically, with respect to information stored in the first line, if the source IP address is SA#1, the destination IP address is DA#1, the source TCP port number is SP#1, and the destination TCP port number is DP#1, then the input/output port is P#1, and no filtering process is required.

The reference tables 33c through 33e store different data, which can be rewritten as desired from outside of the table 33.

Operation of the packet transfer device 40 will be described below.

First, operation of the packet transfer device 40 when packets #1, #2 shown in FIG. 8 are inputted from the Internet 42 to the packet transfer device 40 while the data shown in FIG. 7 are being stored in the reference table 33c, for example, will be described below. The two packets shown in FIG. 8 differ from each other with respect to their destination TCP port numbers only, and are identical to each other with respect to the other data.

When the packet #1 is inputted to the packet transfer device 40, the packet #1 is read via the input/output port 11 and supplied to the processing circuit 30.

Figure 9:
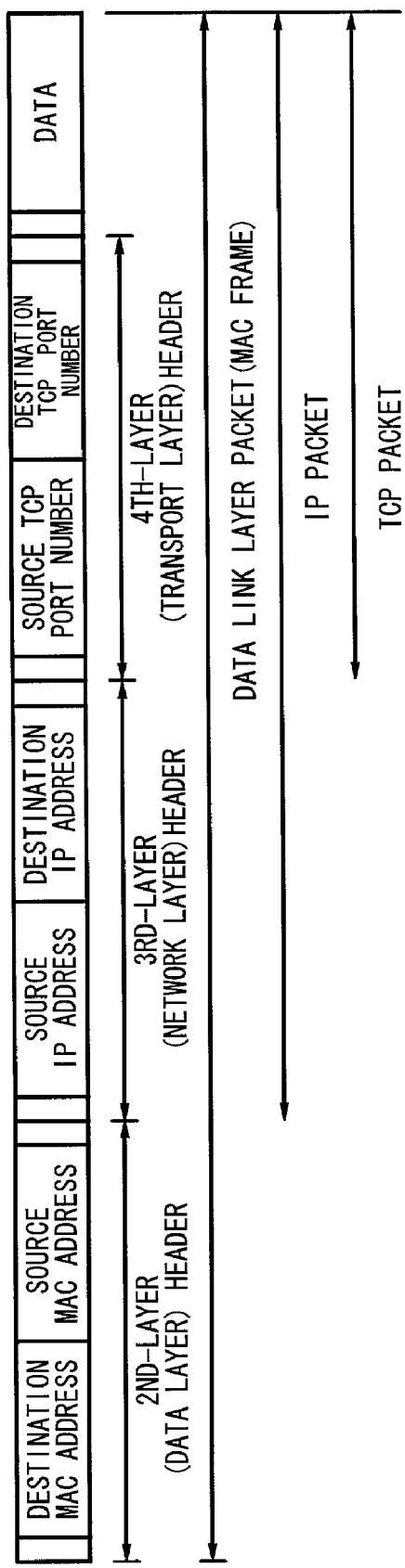
FIG. 9 is a diagram showing a layout of header information contained in a packet.

In the processing circuit 30, the 2nd-layer header information extractor 30a, the 3rd-layer header information extractor 30b, and the 4th-layer header information extractor 30c extract header information of the respective 2nd through 4th layers from the packet #1. Specifically, as shown in FIG. 9, the packet stores a 2nd-layer header, a 3rd-layer header, and a 4th-layer header successively. The 2nd-layer header comprises a destination MAC address and a source MAC address. The 3rd-layer header comprises a destination IP address and a source IP address. The 4th-layer header comprises a destination TCP port number and a source TCP port number. Information of other headers is stored in blank areas in FIG. 9.

In the present example, the 2nd-layer header information extractor 30a extracts a destination MAC address "ma#1" and a source MAC address "max", the 3rd-layer header information extractor 30b extracts a source IP address "gax" and a destination IP address "ga#1", and the 4th-layer header information extractor 30c extracts a source TCP port number "x" and a destination TCP port number "80".

The 2nd- through 4th-layer information extracted by the 2nd-layer header information extractor 30a, the 3rd-layer header information extractor 30b, and the 4th-layer header information extractor 30c is supplied via the reference block interface 30d to the table 33.

In this example, since the reference table 33c stores data including a plurality of items of header information as shown in FIG. 7, the concatenator and comparator 33b of the table 33 concatenates corresponding header information, and compares the data in the reference field stored in the reference table 33c with the header information.

Specifically, the information concatenator 50 of the concatenator and comparator 33b acquires information of the 2nd through 4th layers supplied from the processing circuit 30, extracts header information of the 3rd and 4th layers therefrom, concatenates the extracted header information, then further concatenates the port number of the input/output port from which the packet has been inputted to the header information, and supplies the header information to the reference information register 51.

The reference information register 51 temporarily stores the header information of the 3rd and 4th layers supplied from the information concatenator 50 and the information of the input/output port which has received the packet, and supplies the temporarily stored header information to the reference table 33c.

The reference table 33c compares the header information supplied from the reference information register 51 with the data stored in the reference field. If there is corresponding data in the reference field, then the reference table 33c acquires control information stored in the data field, supplies output port information via the bus 60 to the output port information selector 54, and also supplies filter information via the bus 60 to the filter information selector 55.

In the present example, since the header information of the packet #1 and the input/output port from which the packet is inputted agree with the items in the first line of the reference table shown in FIG. 7, the reference table 33c acquires "CPU" as output port information and "NO" as filter information from the data field, supplies "CPU" to the output port information selector 54, and supplies "NO" to the filter information selector 55. In FIG. 7, "gaany" and "tcpany" represent an arbitrary IP address and an arbitrary TCP port number, respectively.

Since there is no information from reference tables other than the reference table 33c, the output port selector 54 and the filter information selector 55 supply the output port information "CPU" and the filter information "NO" to the requesting processing circuit 30.

The processing circuit 30 receives the information via the reference block interface 30d. Since the filter information represents "NO", the processing circuit 30 recognizes that no filtering process is required, and since the output port information represents "CPU", the processing circuit 30 recognizes that the packet #1 is to be processes by the CPU 20. The processing circuit 30 supplies the packet #1 to the CPU 20.

As a result, the CPU 20 effects a certain process (e.g., a routine process) on the packet #1, and outputs the packet #1 from the corresponding input/output port (e.g., the input/output port 12).

Operation of the packet transfer device 40 at the time a packet #2 is inputted thereto will be described below.

The packet transfer device 40 operates in a manner similar to the above process when the packet #2 is inputted thereto. However, since the packet #2 has a destination TCP port number "100", it corresponds to the information in the 2nd line in the reference table shown in FIG. 7. Therefore, because there is no output port information ("-"), the output port information selector 54 outputs no output port information, and the filter information selector 55 outputs filter information "YES".

As a result, the processing circuit 30 discards the packet #2.

In the present embodiment, if access is made from the Internet 42 connected to the input/output port 11 to a certain TCP port of the host 43, then since it is possible to discard the packet without the need for the CPU 20 to make a decision, the filtering process can be carried out without increasing the burden on the CPU 20.

Operation of the packet transfer device 40 at the time packets #1, #2 shown in FIG. 11 are inputted from the host 43 to the packet transfer device 40 while the data shown in FIG. 10 are being stored in the reference table 33c will be described below.

When the packet #1 is inputted to the packet transfer device 40, the packet #1 is read via the input/output port 11 and supplied to the processing circuit 31.

In the processing circuit 31, the 2nd-layer header information extractor 30a, the 3rd-layer header information extractor 30b, and the 4th-layer header information extractor 30c extract information of the respective 2nd through 4th layers from the packet #1.

In the present example, the 2nd-layer header information extractor 30a extracts a destination MAC address "mpa#2" and a source MAC address "mpa#1", the 3rd-layer header information extractor 30b extracts a source IP address "pa#1" and a destination IP address "pa#2", and the 4th-layer header information extractor 30c extracts a source TCP port number "x" and a destination TCP port number "110".

The 2nd- through 4th-layer header information extracted by the 2nd-layer header information extractor 30a, the 3rd-layer header information extractor 30b, and the 4th-layer header information extractor 30c is supplied 20 via the reference block interface 30d to the table 33.

In this example, since the reference table 33c stores data including a plurality of items of header information as shown in FIG. 10, the concatenator and comparator 33b of the table 33 compares the data in the reference field stored in the reference table 33c with the header information.

Specifically, the information concatenator 50 of the concatenator and comparator 33b acquires header information of the 2nd through 4th layers supplied from the processing circuit 31, extracts header information of the 3rd and 4th layers therefrom, then concatenates the extracted header information, and supplies the header information to the reference information register 51.

The reference information register 51 temporarily stores the header information of the 3rd and 4th layers supplied from the information concatenator 50, and supplies the temporarily stored header information to the reference table 33c.

The reference table 33c compares the header information supplied from the reference information register 51 with the data stored in the reference field. If there is corresponding data in the reference field, then the reference table 33c acquires control information stored in the data field, supplies output port information via the bus 60 to the output port information selector 54, and also supplies filter information via the bus 60 to the filter information selector 55.

In the present example, since the header information of the packet #1 agrees with the information in the first line of the reference table shown in FIG. 10, the reference table 33c acquires "port 13" as output port information and "NO" as filter information from the data field, supplies "port 13" to the output port information selector 54, and supplies "NO" to the filter information selector 55.

Since there is no information from the other reference tables 33d, 33e, the output port information selector 54 and the filter information selector 55 supply the output port information "port 13" and the filter information "NO" to the requesting processing circuit 31.

The processing circuit 31 receives the information via the reference block interface 30d. Since the filter information represents "NO", the processing circuit 31 recognizes that no filtering process is required, and since the output port information represents "port 13", the processing circuit 31 recognizes that the packet #1 is to be outputted from the input/output port 13. The processing circuit 31 supplies the packet #1 to the switch block 17.

The switch block 17 temporarily stores the packet #1 in its buffer, and then supplies the packet #1 to the processing circuit 32.

The processing circuit 32 then outputs the supplied packet #1 via the input/output port 13.

As a result, the packet #1 is transferred to the host 44.

Operation of the packet transfer device 40 at the time a packet #2 is inputted thereto will be described below.

The packet transfer device 40 operates in a manner similar to the above process when the packet #2 is inputted thereto. However, since the packet #2 has a destination TCP port number "100", it corresponds to the information in the 2nd line in the reference table shown in FIG. 10. Therefore, because there is no output port information (represented by "-"), the output port information selector 54 outputs no output port information, and the filter information selector 55 outputs filter information "YES".

As a result, the processing circuit 31 discards the packet #2.

According to the above process, since switching rather than routing is carried out based on the 3rd- and 4th-layer information, the MAC addresses do not need to be reassigned, and hence any process for reassigning the MAC addresses is dispensed with. As a consequence, the packet transfer device may be simplified in arrangement.

Furthermore, because the filtering process is performed at the level of the processing circuits, the filtering process can be performed without the need for the CPU 20 to make a decision, the burden on the CPU 20 can be reduced.

Operation of the packet transfer device 40 at the time packets #1, #2 shown in FIG. 14 are inputted from the Internet 42 to the packet transfer device 40 while the data shown in FIG. 12 are being stored in the reference table 33c and the data shown in FIG. 13 are being stored in the reference table 33d will be described below.

When the packet #1 is inputted to the packet transfer device 40, the packet #1 is read via the input/output port 11 and supplied to the processing circuit 30.

In the processing circuit 30, the 2nd-layer header information extractor 30a, the 3rd-layer header information extractor 30b, and the 4th-layer header information extractor 30c extract header information of the respective 2nd through 4th layers from the packet #1.

In the present example, the 2nd-layer header information extractor 30a extracts a destination MAC address "ma#1" and a source MAC address "ma#2", the 3rd-layer header information extractor 30b extracts a source IP address pa#4" and a destination IP address "pa#1", and the 4th-layer header information extractor 30c extracts a source TCP port number "x" and a destination TCP port number "110".

The 2nd- through 4th-layer information extracted by the 2nd-layer header information extractor 30a, the 3rd-layer header information extractor 30b, and the 4th-layer header information extractor 30c is supplied via the reference block interface 30d to the table 33.

In this example, since the reference table 33c stores data as shown in FIG. 12 and the reference table 33d stores data as shown in FIG. 13, with the data including header information belonging to different layers, the concatenator and comparator 33b of the table 33 compares the data in the reference fields stored in the reference tables 33c, 33d with the header information.

Specifically, the information concatenator 50 of the concatenator and comparator 33b extracts source IP addresses and destination IP addresses from the information of the 2nd through 4th layers supplied from the processing circuit 30, supplies the extracted source IP addresses and destination IP addresses to the reference information register 51, extracts source IP addresses, destination IP addresses, source TCP port numbers, and destination TCP port numbers, and supplies the extracted source IP addresses, destination IP addresses, source TCP port numbers, and destination TCP port numbers to the reference information register 52.

The reference information register 51 and the reference information register 52 temporarily store the header information supplied from the information concatenator 50, and supplies the temporarily stored header information to the reference table 33c and the reference table 33d, respectively.

The reference table 33c compares the header information supplied from the reference information register 51 with the data stored in the reference field. If there is corresponding data in the reference field, then the reference table 33c acquires control information stored in the data field, supplies output port information via the bus 60 to the output port information selector 54, and also supplies filter information via the bus 60 to the filter information selector 55.

Likewise, the reference table 33d compares the header information supplied from the reference information register 52 with the data stored in the reference field. If there is corresponding data in the reference field, then the reference table 33d acquires control information stored in the data field, supplies output port information via the bus 60 to the output port information selector 54, and also supplies filter information via the bus 60 to the filter information selector 55.

In the present example, since the header information of the packet #1 agrees with the information in the first line of the reference table shown in FIG. 12, the reference table 33c acquires "ports 12, 13" as output port information and "NO" as filter information from the data field, supplies "ports 12, 13" to the output port information selector 54, and supplies "NO" to the filter information selector 55.

Since the header information of the packet #1 agrees with the information in the first line of the reference table shown in FIG. 13, the reference table 33d acquires "port 13" as output port information and "NO" as filter information from the data field, supplies "port 13" to the output port information selector 54, and supplies "NO" to the filter information selector 55.

As the output port information supplied from the reference table 33c and the output port information supplied from the reference table 33d are different from each other, the output port information selector 54 selects the output port information "port 13" from the reference table 33d, which is a reference table containing header information of a higher layer, and supplies the selected output port information "port 13" to the processing circuit 31.

Because the filter information supplied from both the reference table 33c and the reference table 33d represents "NO", the filter information selector 55 supplies the filter information "NO" to the processing circuit 31.

The processing circuit 31 receives the information via the reference block interface 30d. Since the filter information represents "NO", the processing circuit 31 recognizes that no filtering process is required, and since the output port information represents "port 13", the processing circuit 31 recognizes that the packet #1 is to be outputted from the input/output port 13. The processing circuit 31 supplies the packet #1 to the switch block 17.

The switch block 17 temporarily stores the packet #1 in its buffer, and then supplies the packet #1 to the processing circuit 32.

The processing circuit 32 then outputs the supplied packet #1 via the input/output port 13.

As a result of the above process, the packet #1 is transferred via the input/output port 13.

Operation of the packet transfer device 40 at the time a packet #2 is inputted thereto will be described below.

The packet transfer device 40 operates in a manner similar to the above process when the packet #2 is inputted thereto. However, since the packet #2 has a destination IP address "pa#2" and a source IP address "pa#4", "port 13" is acquired as output port information from the reference table 33c and "YES" is acquired as filter information from the reference table 33c.

Since the packet #2 has a source IP address "pa#4", a destination IP address "pa#2", and a destination TCP port number "100", "port 13" is acquired as output port information from the reference table 33d and "NO" is acquired as filter information from the reference table 33d.

Because both the output port information supplied from the reference table 33c and the output port information supplied from the reference table 33d represent "port 13" and hence agree with each other, the output port information selector 54 supplies the output port information "port 13" to the processing circuit 31.

The filter information supplied from the reference table 33c represents "YES" and the filter information supplied from the reference table 33d represents "NO". Therefore, they do not agree with each other. However, if any of the reference tables contains filter information "YES", then the packet should be discarded for better security. Therefore, the filter information selector 55 supplies the filter information "YES" to the processing circuit 31.

Since the filter information represents "YES", the processing circuit 31 does not transfer, but discards the packet #2.

According to the above process, a plurality of reference tables are established, output port information from one of the reference tables which contains header information of a highest layer in its reference field is selected, and a filtering process is carried out if the filter information "YES" is outputted from either one of the reference tables. Therefore, since according to the filtering process a packet can be discarded if either one of the settings is satisfied, it is possible to increase the security and also to effectively reduce the number of packets that flow in the network.

Inasmuch as output port information from one of the reference tables which contains header information of a highest layer in its reference field is selected, it is possible to perform the transfer control of packets at a level close to the application program.

In the above embodiment, reference tables containing header information belonging to a plurality of layers have been described by way of example. However, as shown in FIGS. 15(A) and 15(B), data including only header information belonging to a single layer in reference fields may be stored in a plurality of reference tables.

FIG. 15(A) shows an example in which only IP addresses are stored in a reference field, and FIG. 15(B) shows an example in which only TCP port numbers are stored in a reference field. Specifically, destination IP addresses are stored in association with input/output port numbers in the example shown in FIG. 15(A), and destination TCP port numbers are stored in association with input/output port numbers in the example shown in FIG. 15(B).

Even if a table containing single header information in its reference field is used, it is possible to perform the same function as with the reference table containing a plurality of items of header information as described above, by selecting control information outputted from the reference table based on a certain rule.

Figure 16:
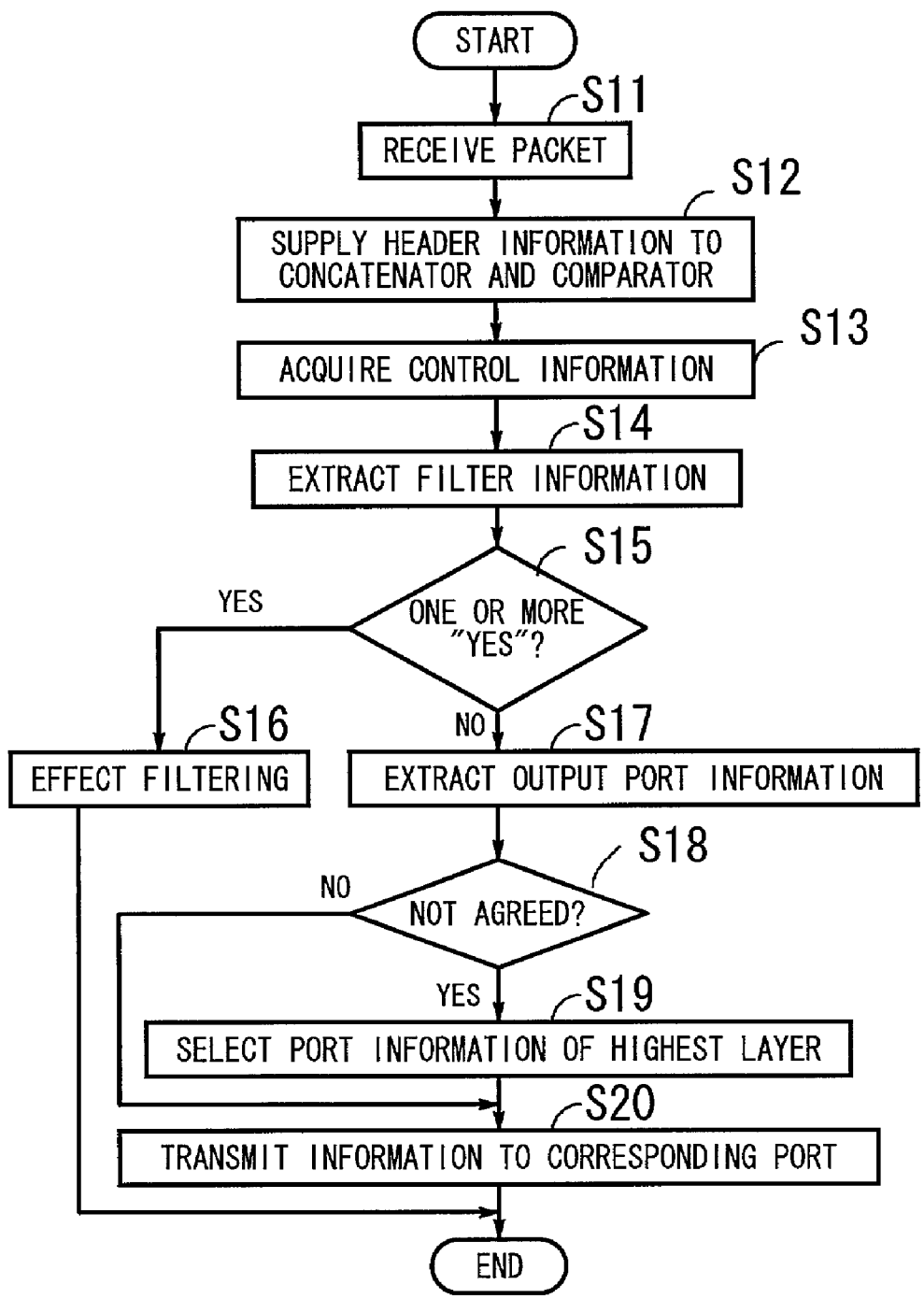
FIG. 16 is a flowchart of a processing sequence which is carried out by the concatenator and comparator.

A processing sequence carried out by the concatenator and comparator 33b will be described below with reference to FIG. 16. When the processing sequence shown in FIG. 16 is executed, the following steps are carried out.

Step S11:
The input/output port which is supplied with a packet receives the packet and supplies the packet to a processing circuit.

Step S12:
The 2nd- through 4th-layer header information extractors of the processing circuit extract 2nd- through 4th-layer header information from the packet and supply the extracted 2nd- through 4th-layer header information to the concatenator and comparator 33b.

Step S13:
The concatenator and comparator 33b concatenates the supplied header information, supplies the concatenated header information to the reference information registers 51 through 53, and acquires control information which is outputted from the reference tables 33c through 33e as a result.

Step S14:
The filter information selector 55 extracts filter information from the control information.

Step S15:
If there are a plurality of items of control information, then the filter information selector 55 determines whether there is one or more filter information "YES" or not. If there is one or more filter information "YES", then control goes to step S16. Otherwise, control goes to step S17.

Step S16:
The processing circuit which has received the packet discards the packet according to the filtering process.

Step S17:
The output port information selector 54 extracts output port information from the control information.

Step S18:
If there are a plurality of items of output port information, then the output port information selector 54 determines whether the items of output port information agree with each other or not. If the items of output port information do not agree with each other, then control goes to step S19. Otherwise, control goes to step S20.

Step S19:
The output port information selector 54 selects output port information of the reference table which contains header information of the highest layer in its reference field.

Step S20:

The processing circuit which has received the packet supplies the packet to the corresponding switch block 17. As a result, the switch block 17 outputs the packet from the designated input/output port.

The above processing sequence makes it possible to perform the functions described above.

According to the present embodiment, as described above, not only header information belonging to the 2nd layer but also header information belonging to the 3rd and higher layers is extracted from the packet and compared with the reference table for determining the details for controlling the packet. Therefore, communication policy details can be set for each input/output port, terminal, and packet without increasing the burden on the CPU 20, making it possible to construct a system which is flexible and highly secure.

A packet transfer device according to a second embodiment of the present invention will be described below.

The packet transfer device according to the second embodiment is designed for the purpose of effecting priority control over packets in order to improve QoS (Quality of Service).

Figure 17:
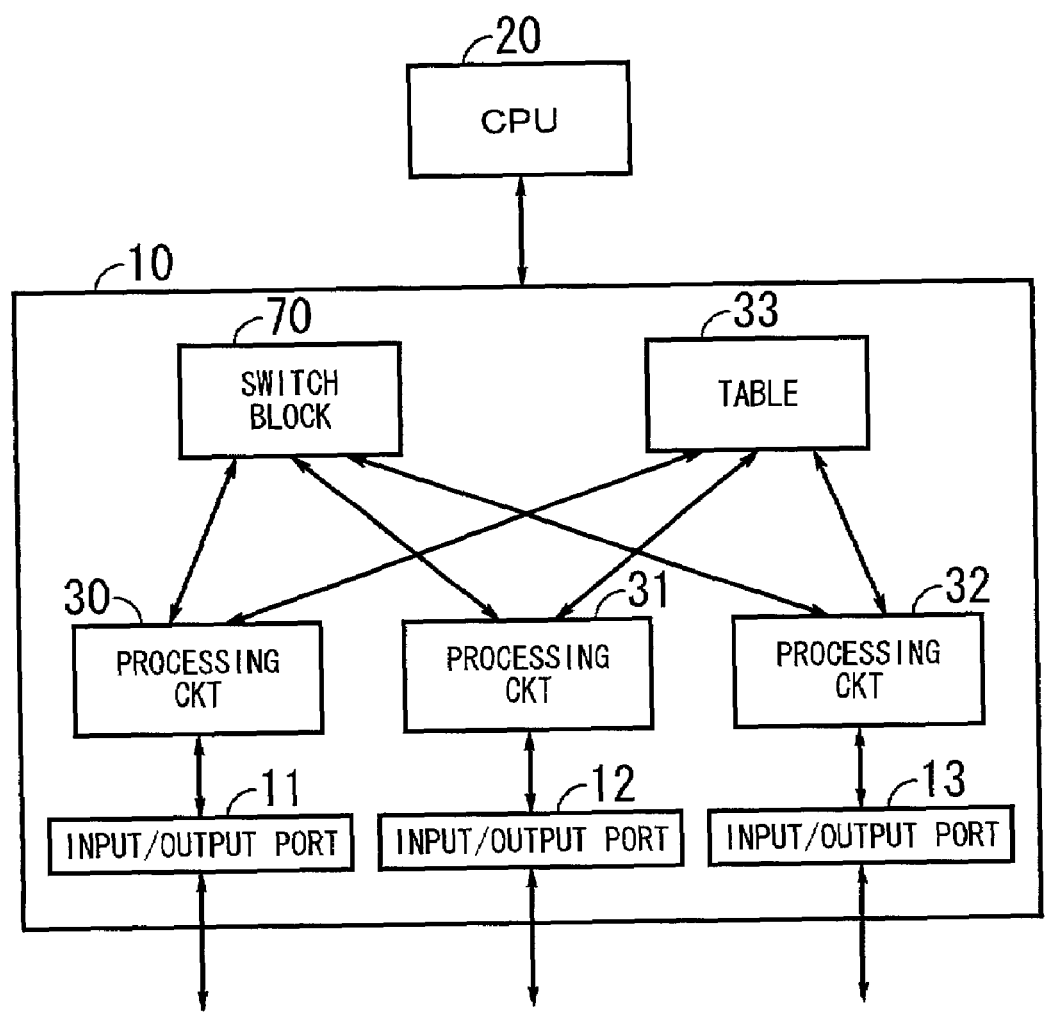
FIG. 17 is a block diagram of a packet transfer device according to a second embodiment of the present invention.

FIG. 17 shows in block form the packet transfer device according to the second embodiment. Those parts of the packet transfer device shown in FIG. 17 which are identical to those of the packet transfer device shown in FIG. 3 are denoted by identical reference characters, and will not be described below. The packet transfer device shown in FIG. 17 differs from the packet transfer device shown in FIG. 3 in that the switch block 17 shown in FIG. 3 is replaced with a switch block 70 and the data stored in the table 33 shown in FIG. 17 are partly different from the data stored in the table 33 shown in FIG. 3. Other details of the packet transfer device shown in FIG. 17 are the same as the packet transfer device shown in FIG. 3.

Figure 18:
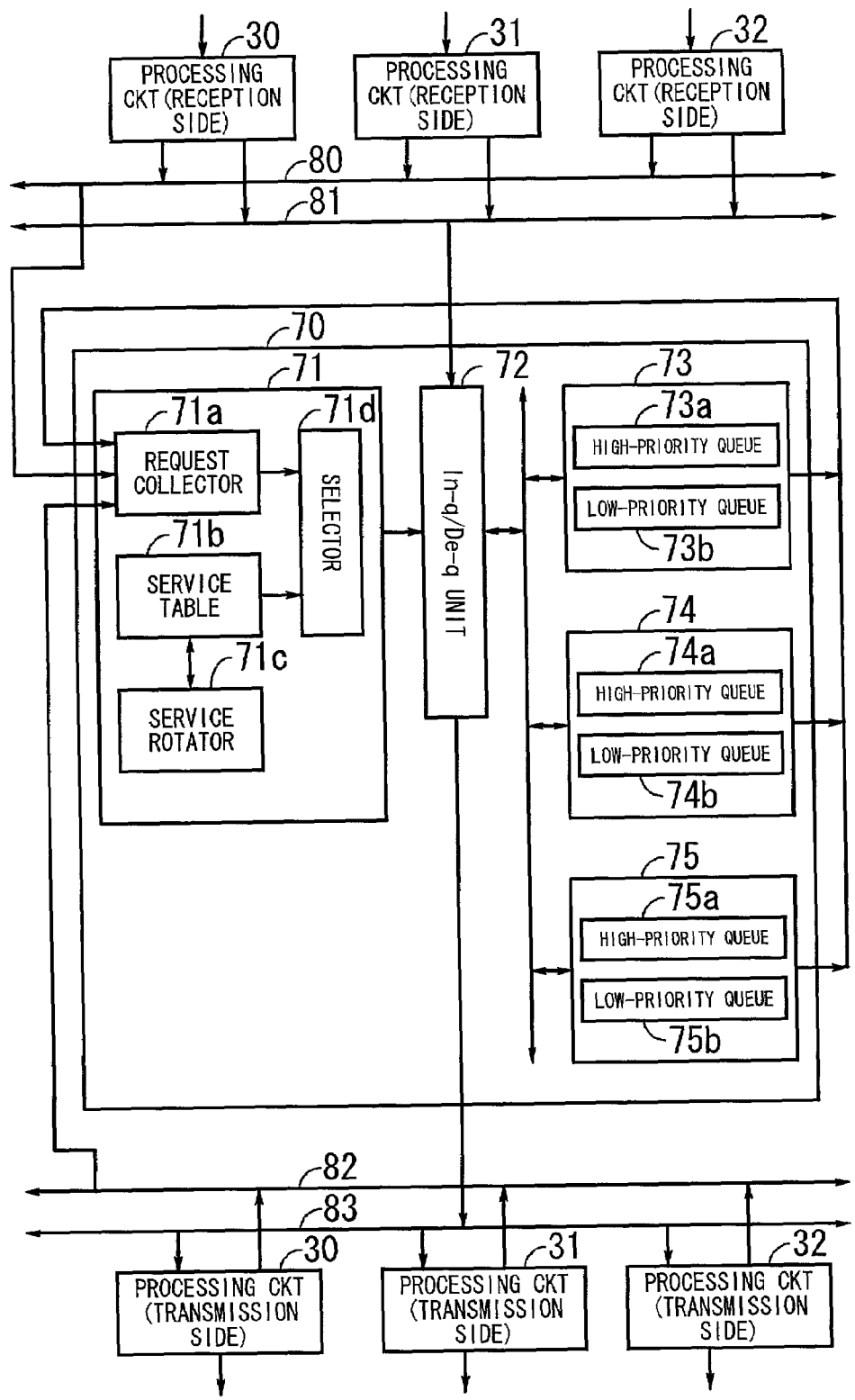
FIG. 18 is a block diagram showing a detailed structure of a switch block shown in FIG. 17.

FIG. 18 shows in block diagram a detailed structure of the switch block 70 shown in FIG. 17. In FIG. 18, processing circuits 30 through 32 positioned in an upper region and processing circuits 30 through 32 positioned in a lower region are identical to each other. For illustrative purposes, the processing circuits 30 through 32 positioned in the upper region are shown as having a receiving function, and the processing circuits 30 through 32 positioned in the lower region are shown as having a transmitting function.

The switch block 70 comprises a scheduler 71, an In-q/De-q unit 72, a queue assembly 73 for the input/output port 11, a queue assembly 74 for the input/output port 12, and a queue assembly 75 for the input/output port 13.

The scheduler 71 comprises a request collector 71a, a service table 71b, a service rotator 71c, and a selector 71d. The scheduler 71 schedules a sequence to process reception or transmission requests for the processing circuits 30 through 32 to receive or transmit packets, and gives an instruction based on the scheduled sequence to the In-q/De-q unit 72.

The request collector 71a collects reception requests outputted from the processing circuits 30 through 32 and transmission requests outputted from the queue assemblies 73 through 75, and transfers the collected reception and transmission requests to the selector 71d.

The service table 71b has a register group for processing requests, and processes requests depending on the register group. Specifically, the service table 71b has a group of registers RIF[1]-H through RIF[3]-H for high priority for reception and a group of registers RIF[1]-L through RIF[3]-L for low priority for reception. The registers RIF[1]-H through RIF[3]-H have IF#1 through IF#3 registered respectively therein, and the registers RIF[1]-L through RIF[3]-L have IF#1 through IF#3 registered respectively therein. The service table 71b also has a group of registers TIF[1]-H through TIF[3]-H for high priority for transmission and a group of registers TIF[1]-L through TIF[3]-L for low priority for transmission. IF#1 through IF#3 represent the processing circuits 30 through 32, respectively.

The selector 71d compares requests collected by the request collector 71a with data outputted from the service table 71b, selects requests to be accepted, and indicates the selected requests to the In-q/De-q unit 72.

The In-q/De-q unit 72 acquires received data from input/output ports selected by the selector 71d among the processing circuits 30 through 32, acquires data corresponding to requests selected by the selector 71d from the corresponding processing circuits 30 through 32, and stores the data in the corresponding queue assemblies 73 through 75. If the requests are transmission requests, then the In-q/De-q unit 72 supplies packets stored in the queue assemblies 73 through 75 to the processing circuits 30 through 32 for transmission therefrom.

The queue assemblies 73 through 75 have high-priority queues 73a through 75a and low-priority queues 73b through 75b. The high-priority queues 73a through 75a temporarily store high-priority packets until they are transmitted, and the low-priority queues 73b through 75b temporarily store low-priority packets until they are transmitted.

A reception request line 80 transmits reception requests outputted from the processing circuits 30 through 32 to the request collector 71a.

A reception data line 81 transfers data of packets outputted from the processing circuits 30 through 32 to the In-q/De-q unit 72.

A transmission request line 82 transmits transmission requests outputted from the processing circuits 30 through 32 to the request collector 71a.

A transmission data line 83 transfers data outputted from the In-q/De-q unit 72 to the corresponding processing circuits 30 through 32.

FIG. 19 shows an example of reference tables 33c through 33e of the table 33 shown in FIG. 4. As shown in FIG. 19, each of the reference tables 33c through 33e comprises a reference field and a data field. The reference field stores combinations of header information belonging to the 2nd through 4th layers. In the example shown in FIG. 19, the reference field stores source IP addresses and destination IP addresses belonging to the 3rd layer and source TCP port numbers and destination TCP port numbers belonging to the 4th layer.

The data field stores input/output port information specifying ports from which to output data and to which input data, and priority information representing priorities of packets.

Specifically, with respect to information stored in the first line, if the source IP address is SA#1, the destination IP address is DA#1, the source TCP port number is SP#1, and the destination TCP port number is DP#1, then the input/output port is P#1, and the priority is #1. The priority is higher as the numerical value following "#" is smaller.

The reference tables 33c through 33e store different data, which can be rewritten as desired from outside of the table 33.

Operation of the packet transfer device according to the second embodiment will be described below. First, operation of the packet transfer device when a packet #1 shown in FIG. 21 is inputted from the Internet 42 to the host 43 and a packet

2 shown in FIG. 21 is transferred from the host 44 to the host 43 while the data shown in FIG. 20 are being stored in the reference tables 33c through 33e, for example, will be described below.

When the packet #1 is inputted from the Internet 42 to the packet transfer device 40, the packet #1 is read via the input/output port 11 and supplied to the processing circuit 30.

In the processing circuit 30, the 2nd-layer header information extractor 30a, the 3rd-layer header information extractor 30b, and the 4th-layer header information extractor 30c extract header information of the respective 2nd through 4th layers from the packet #1. Specifically, as shown in FIG. 9, the packet stores a 2nd-layer header, a 3rd-layer header, and a 4th-layer header successively. The 2nd-layer header comprises a destination MAC address and a source MAC address. The 3rd-layer header comprises a destination IP address and a source IP address. The 4th-layer header comprises a destination TCP port number and a source TCP port number. Information of other headers is stored in blank areas in FIG. 9.

In the present example, the 2nd-layer header information extractor 30a extracts a destination MAC address "ma#2" and a source MAC address "ma#1", the 3rd-layer header information extractor 30b extracts a source IP address "pa#1" and a destination IP address "pa#2", and the 4th-layer header information extractor 30c extracts a source TCP port number "6000" and a destination TCP port number "6300".

The 2nd- through 4th-layer information extracted by the 2nd-layer header information extractor 30a, the 3rd-layer header information extractor 30b, and the 4th-layer header information extractor 30c is supplied via the reference block interface 30d to the table 33.

In this example, since the reference table 33c stores data including a plurality of items of header information as shown in FIG. 20, the concatenator and comparator 33b of the table 33 concatenates corresponding header information, and compares the data in the reference field stored in the reference table 33c with the header information.

Specifically, the information concatenator 50 of the concatenator and comparator 33b acquires information of the 2nd through 4th layers supplied from the processing circuit 30, extracts header information of the 3rd and 4th layers therefrom, concatenates the extracted header information, then further concatenates the port number of the input/output port from which the packet has been inputted to the header information, and supplies the header information to the reference information register 51.

The reference information register 51 temporarily stores the header information of the 3rd and 4th layers supplied from the information concatenator 50 and the information of the input/output port which has received the packet, and supplies the temporarily stored header information to the reference table 33c.

The reference table 33c compares the header information supplied from the reference information register 51 with the data stored in the reference field. If there is corresponding data in the reference field, then the reference table 33c acquires control information stored in the data field, supplies output port information via the bus 60 to the output port information selector 54, and also supplies priority information via the bus 60 to the processing circuit 30.

In the present example, since the header information of the packet #1 and the input/output port from which the packet is inputted agree with the items in the first line of the reference table shown in FIG. 20, the output port information selector 54 acquires "port 12" as output port information from the data field, and the filter information selector 55 (or a priority information selector, not shown, which exclusively handles priority information) acquires "priority high" as priority information from the data field. The output port information "port 12" is supplied to the output port information selector 54, and the priority information "priority high" is supplied to the processing circuit 30.

Since there is no information from reference tables other than the reference table 33c, the output port selector 54 supplies the output port information "port 12" to the requesting processing circuit 30.

The processing circuit 30 receives the information via the reference block interface 30d, and recognizes that the priority is "high" from the priority information and that the "input/output port 12" is an output port from the input/output port information.

Then, the processing circuit 30 outputs a reception request indicating that the priority is "high" via the reception request line 80 to the request collector 71a. As a result, the reception request line 80 receives the request, and supplies the received request to the selector 71d. At this time, the service table 71b first selects and searches the register group RIF[n]-H in the order of the registers RIF[1]-H through RIF[3]-H. Since IF#1 is registered in the register RIF[1]-H, the selector 71d performs a matching between the output from the request collector 71a and the service table 71b, determines that a packet from IF#1 is to be received, and supplies the determined result to the In-q/De-q unit 72.

The In-q/De-q unit 72 acquires the packet #1 from the processing circuit 30 via the reception data line 81, and stores the packet #1 in the high-priority queue 74a of the queue assembly 74 which corresponds to the input/output port 12 as an output destination.

When the storage of the packet is finished, the service rotator 71c moves IF#1 which has finished the reception of the packet to the tail end of the register group RIF[n]-H. As a result, the register group RIF[n]-H stores data in the order of IF#2, IF#3, IF#4, IF#1. This operation is carried out in order to equally accept requests from the processing circuits. If after the above operation high-priority reception requests are made from the processing circuit 30 and the processing circuit 31, for example, then a packet from IF#2 which has previously been registered in the register group RIF[n]-H is received. As a consequence, the processing is performed on a packet from a processing circuit whose request has had the least chance to be accepted.

When the packet #2 is inputted from the host 44 to the packet transfer device 40, the packet #2 is read via the input/output port 13 and supplied to the processing circuit 32.

In the processing circuit 32, the 2nd-layer header information extractor 32a extracts a destination MAC address "ma#2" and a source MAC address "ma#3", the 3rd-layer header information extractor 30b extracts a source IP address "pa#3" and a destination IP address "pa#2", and the 4th-layer header information extractor 30c extracts a source TCP port number "x" (given source TCP port number) and a destination TCP port number "100".

The 2nd- through 4th-layer information extracted by the 2nd-layer header information extractor 32a, the 3rd-layer header information extractor 32b, and the 4th-layer header information extractor 32c is supplied via the reference block interface 32d to the table 33.

The information concatenator 50 of the concatenator and comparator 33b acquires header information of the 2nd through 4th layers supplied from the processing circuit 32, extracts header information of the 3rd and 4th layers therefrom, concatenates the extracted header information, then further concatenates the port number of the input/output port from which the packet has been inputted to the header information, and supplies the header information to the reference information register 51.

The reference information register 51 temporarily stores the header information of the 3rd and 4th layers supplied from the information concatenator 50 and the information of the input/output port which has received the packet, and supplies the temporarily stored header information to the reference table 33c.

The reference table 33c compares the header information supplied from the reference information register 51 with the data stored in the reference field. If there is corresponding data in the reference field, then the reference table 33c acquires control information stored in the data field, supplies output port information via the bus 60 to the output port information selector 54, and also supplies priority information via the bus 60 to the processing circuit 30.

In the present example, since the header information of the packet #2 and the input/output port from which the packet is inputted agree with the items in the 2nd line of the reference table shown in FIG. 20, the reference table 33c acquires "port 12" as output port information from the data field, acquires "priority low" as priority information from the data field, and supplies the output port information "port 12" to the output port information selector 54, and the priority information "priority low" to the processing circuit 32.

Since there is no information from reference tables other than the reference table 33c, the output port selector 54 supplies the output port information "port 12" to the requesting processing circuit 32.

The processing circuit 32 receives the information via the reference block interface 32d, and recognizes that the priority is "low" from the priority information and that the "input/output port 12" is an output port from the input/output port information.

Then, the processing circuit 32 outputs a reception request indicating that the priority is "low" via the reception request line 80 to the request collector 71a. As a result, the reception request line 80 receives the request, and supplies the received request to the selector 71d. At this time, the service table 71b first searches the register group RIF[1]-H through RIF[3]-H. Since the register group does not agree with the reception request from the processing circuit 32, the service table 71b then searches the register group RIF[1]-L through RIF[3]-L. The register RIF[3]-L agrees with the request from the processing circuit 32, and the selector 71d sends the agreement information to the In-q/De-q unit 72.

The In-q/De-q unit 72 acquires the packet #2 from the processing circuit 32 via the reception data line 81, and stores the packet #2 in the low-priority queue 74b of the queue assembly 74 which corresponds to the input/output port 12 as an output destination.

When the storage of the packet is finished, the service rotator 71c moves IF#3 which has finished the reception of the packet to the tail end of the register group RIF[n]-L. As a result, the register group RIF[n]-L stores data in the order of IF#1, IF#2, IF#4, IF#3.

Operation to transmit the packets #1, #2 thus stored respectively in the high-priority queue 74a and the low-priority queue 74b will be described below.

The queue assembly 74 which has stored the packets outputs requests indicating that the priority is high and transmission requests indicating that the priority is low to the request collector 71a. At this time, since the processing circuits 30 through 32 supply enable signals via the signal line 82 when they become ready for transmitting packets, the request collector 71a ANDs the transmission requests and the enable signals, collects those transmission requests which make the ANDed result active, and supplies the collected transmission requests to the selector 71d.

As described above, the service table 71b has register groups TIF[1]-H through TIF[3]-H and TIF[1]-L through TIF[3]-L for transmission, successively searches the register groups, and supplies data to the selector 71d.

The selector 71d compares the transmission requests supplied from the request collector 71a and the data supplied from the service table 71b with each other. If there is a matching request, then the selector 71d selects and outputs the matching request.

In the present example, since the transmission requests from the queue assembly 74 are the high-priority transmission request of the packet #1 and the low-priority transmission request of the packet #2, the service table 71b outputs IF#2 stored in the register TIF[2]-H. As a result, the In-q/De-q unit 72 acquires the packet #1 from the high-priority queue 74a, and supplies the packet #1 via the transmission data line 83 to the processing circuit 31.

The processing circuit 31 transmits the packet #1 via the input/output port 12 to the host 43.

When the transmission of the packet #1 is finished, the service rotator 71c moves IF#2 which is stored in the register group TIF[n]-H to the tail end of the register group. The service table 71b goes back to the beginning end of the register group TIF[n]-H and resumes the search. As there is no transmission request where the priority is "high", the service table 71b searches the register group TIF[n]-L, and supplies IF#2 stored in the register TIF[2]-L to the selector 71d. Since IF#2 agrees with the transmission request corresponding to the packet #2, the selector 71d instructs the In-q/De-q unit 72 to transmit the packet #2.

The In-q/De-q unit 72 then instructs the low-priority queue 74b to transmit the packet #2. As a result, the packet #2 is read from the low-priority queue 74b and supplied to the processing circuit 31.

The processing circuit 31 transmits the packet #2 via the input/output port 12 to the host 43.

When the transmission of the packet #2 is finished, the service rotator 71c moves IF#2 which is stored in the register group TIF[n]-L to the tail end of the register group.

As described above, when a reception request or a transmission request is made, the register group TIF[n]-H is first referred to and then the register group TIF[n]-L is referred to. Accordingly, it is possible to transfer a high-priority packet with priority.

Requests from all the ports can equally be accepted because the data is moved to the tail end of the register group RIF[n]-H or RIF[n]-L or TIF[n]-H or TIF[n]-L when the processing of a reception request or a transmission request is finished.

According to the above process, it is possible to hardware-implement a priority control for packets without the need for the CPU 20 to make a decision.

Figure 22:
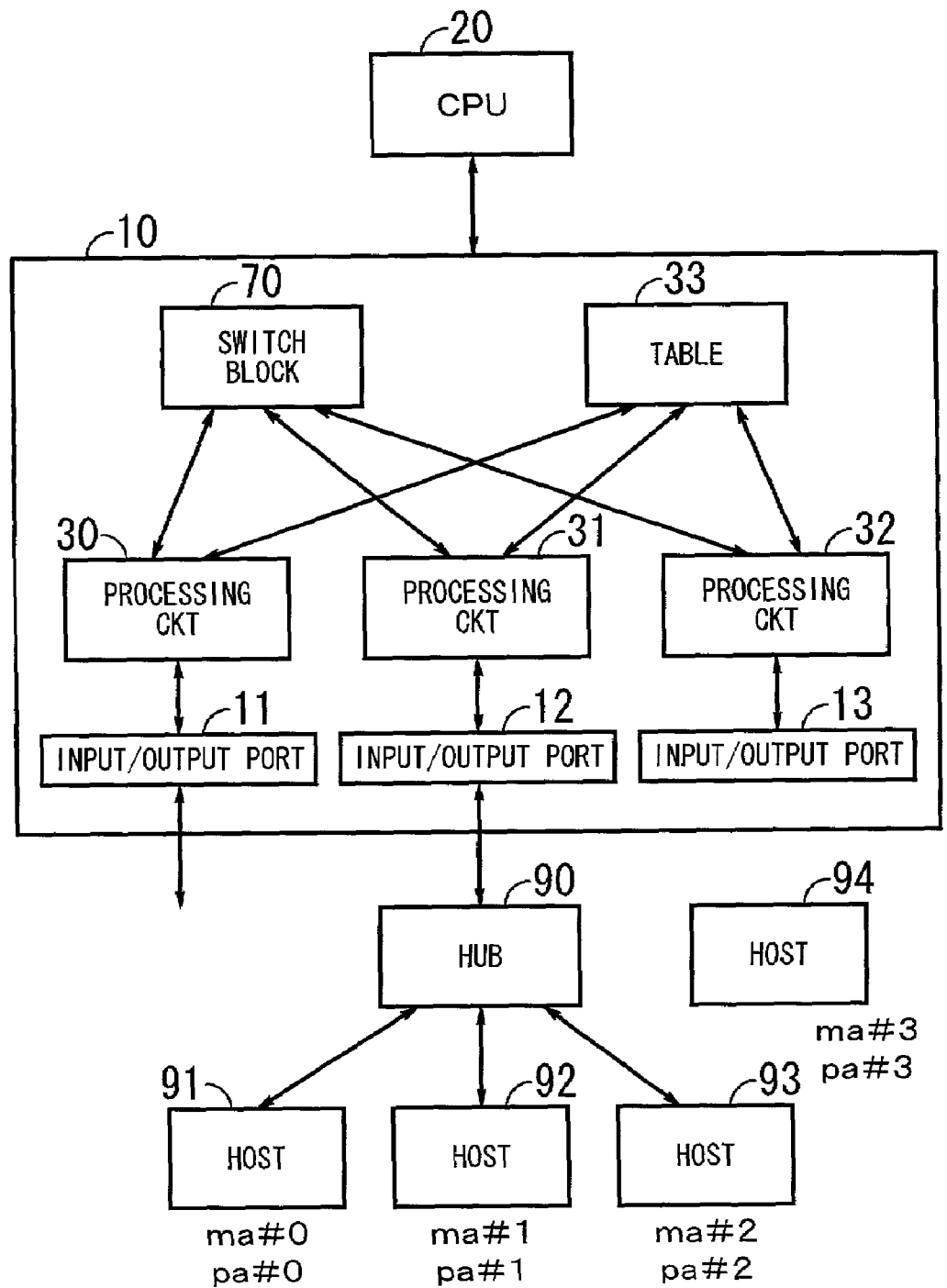
FIG. 22 is a block diagram of a packet transfer device having a plurality of priorities.

In the above embodiment, only two types of priority, i.e., "high" and "low", have been described. However, a plurality of types of priority may be employed. FIG. 22 shows in block form a packet transfer device which can employ three types (high, medium, low) of priority. The packet transfer device shown in FIG. 22 differs from the packet transfer device shown in FIG. 17 as to the layout of nodes connected to the input/output port 12 and the input/output port 13 and the data stored in the table 33, and also in that in order for the switch block 70 to handle three types of priority, the queue assemblies 73 through 75 have respective medium-priority queues (not shown) and the service table 71b has register groups RIF[n]-M and TIF[n]-M for medium priority. Other details of the packet transfer device shown in FIG. 22 are the same as those of the packet transfer device shown in FIG. 17.

As shown in FIG. 22, a hub 90 and hosts 91 through 93 are connected to the input/output port 12. The hub 90 is a device for enabling the transfer of packets between the hosts 91 through 93 and also between the hosts 91 through 93 and the packet transfer device 10.

FIG. 23 shows by way of example data stored in the reference table 33c. In FIG. 23, control bits represent information indicative of the position where priority information is inserted in a packet. In the illustrated example, the control bits are set to "10001", indicating combinations of source IP addresses and TOS fields in destination IP addresses. The priority information and port information may be separated and stored in separate tables. According to the present embodiment, setting flexibility is increased and expandability is also increased.

In FIG. 23, TOS represents information embedded in TOS fields. In this example, TOS is set to three types, i.e., "000", "100", and "010". Priority: port represents the priority of a corresponding packet and an input/output port from which to output the packet. In this example, "000" is set to low priority, "100" to high priority, and "010" to medium priority.

FIG. 24 shows by way of example packets inputted to the packet transfer device shown in FIG. 22. In FIG. 24, the packet #1 is transferred from the host 91 to the host 94, the packet #2 from the host 92 to the host 94, and the packet #3 from the host 93 to the host 94.

Operation of the packet transfer device shown in FIG. 22 will briefly be described below.

When the packet #1 is transmitted from the host 91, the packet #1 is transferred via the hub 90 to the packet transfer device 40. The packet transfer device 40 receives the packet #1 via the input/output port 12, and supplies the packet #1 to the processing circuit 31.

The processing circuit 31 supplies the header information of the packet #1 to the table 33 to specify an input/output port from which to output the packet #1 and the priority of the packet #1.

In the present example, since the header information of the packet #1 agrees with the items in the first line shown in FIG. 23, the priority of the packet #1 is "low". Therefore, the table 33 transmits the information that the port from which to output the packet #1 is "input/output port 12" and the priority of the packet #1 is "low", to the processing circuit 31.

The processing circuit 31 then transmits the information representing the priority and the port from which to output the packet #1, to the switch block 70. As a result, the switch block 70 stores the packet #1 in the corresponding queue and thereafter transmits the packet #1 from the processing circuit 32 to the host 94 according to the same process as described above. Since the service table 71b processes requests in the order of the register groups RIF[n]-H, RIF[n]-M, RIF[n]-L, the packet #1 whose priority is "low" is processed with low priority.

The header information of the packet #2 agrees with the items in the second line of the reference table shown in FIG. 24. Therefore, the port from which to output the packet #2 is "input/output port 12" and the priority of the packet #2 is "high". The switch block 70 thus transmits the packet #2 via the input/output port 12 to the host 94 according to the same process as described above. Since the priority of the packet #2 is "high", the packet #2 is processed with high priority according to the same process as described above.

The header information of the packet #3 agrees with the items in the third line of the reference table shown in FIG. 24. Therefore, the port from which to output the packet #3 is "input/output port 12" and the priority of the packet #3 is "medium". The switch block 70 thus transmits the packet #3 via the input/output port 12 to the host 94 according to the same process as described above. Since the priority of the packet #3 is "medium", the packet #3 is processed with medium priority according to the same process as described above.

According to the above process, because three types of priority can be set and packets can be controlled with priority, it is possible to provide a premium service for setting priority ranks for the respective hosts.

Finally, a process carried out by the packet transfer device shown in FIG. 17 will be described below with reference to FIGS. 25 through 27.

Figure 25:
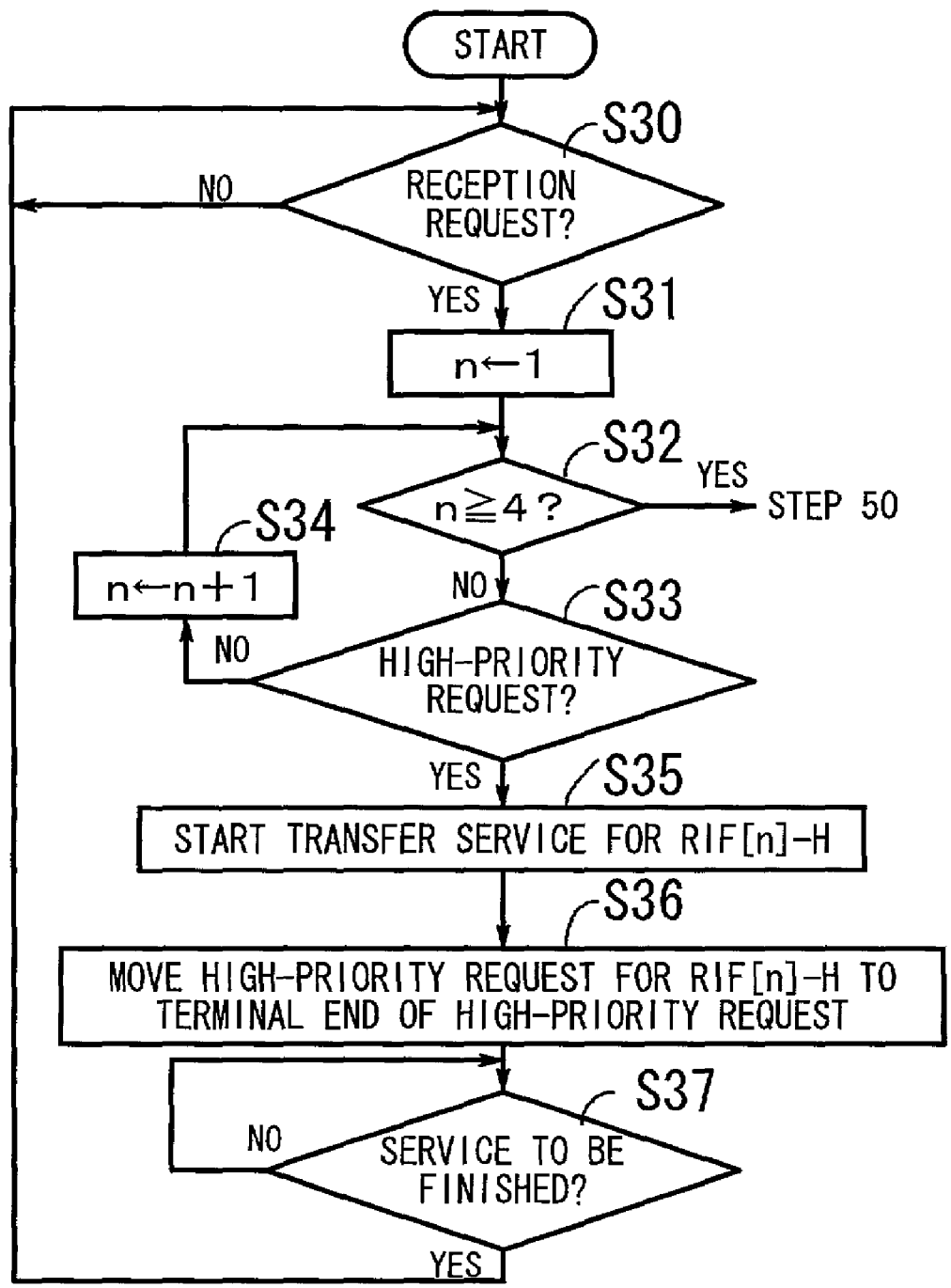
FIG. 25 is a flowchart of a processing sequence which is carried out by the packet transfer device shown in FIG. 17.

FIG. 25 shows a processing sequence for receiving a packet with high priority. When the processing sequence shown in FIG. 25 is executed, the following steps are carried out.

Step S30:

The request collector 71a of the switch block 70 determines whether there is a reception request or not. If there is a reception request, control goes to step S31. Otherwise, the processing of step S30 is repeated.

Step S31:

The service table 71b places "1" in the variable n.

Step S32:

The service table 71b determines whether or not the value of the variable n is equal to or higher than 4. If the value of the variable n is equal to or higher than 4, then control goes to step S50 shown in FIG. 26. Otherwise, control goes to step S33.

Step S33:

The selector 71d refers to the reception request from the request collector 71a. If the reception request agrees with information registered in the register RIF[1]-H in the service table 71b, i.e., if there is a high-priority request, then control goes to step S35. Otherwise, control goes to step S34.

Step S34:

The service table 71b increments the value of the variable n by "1".

Step S35:

The selector 71d requests the In-q/De-q unit 72 to start a transfer service of the input/output port corresponding to the contents of the register group RIF[n]-H. As a result, packets start being read from the corresponding processing circuit and stored in the corresponding queue.

The transfer service referred to above means a process of storing a packet in a queue in the reception process and a process of transmitting a packet in the transmission process.

Step S36:

The service rotator 71c moves the high-priority request of RIF[n]-H to the tail end of high-priority requests.

Step S37:

The scheduler 71 determines whether the service is to be finished or not, i.e., whether the process of storing a packet in a queue is to be finished or not. If the service is to be finished, then control goes back to step S30 to repeat the above process. Otherwise, the processing of step S37 is repeated.

Figure 26:
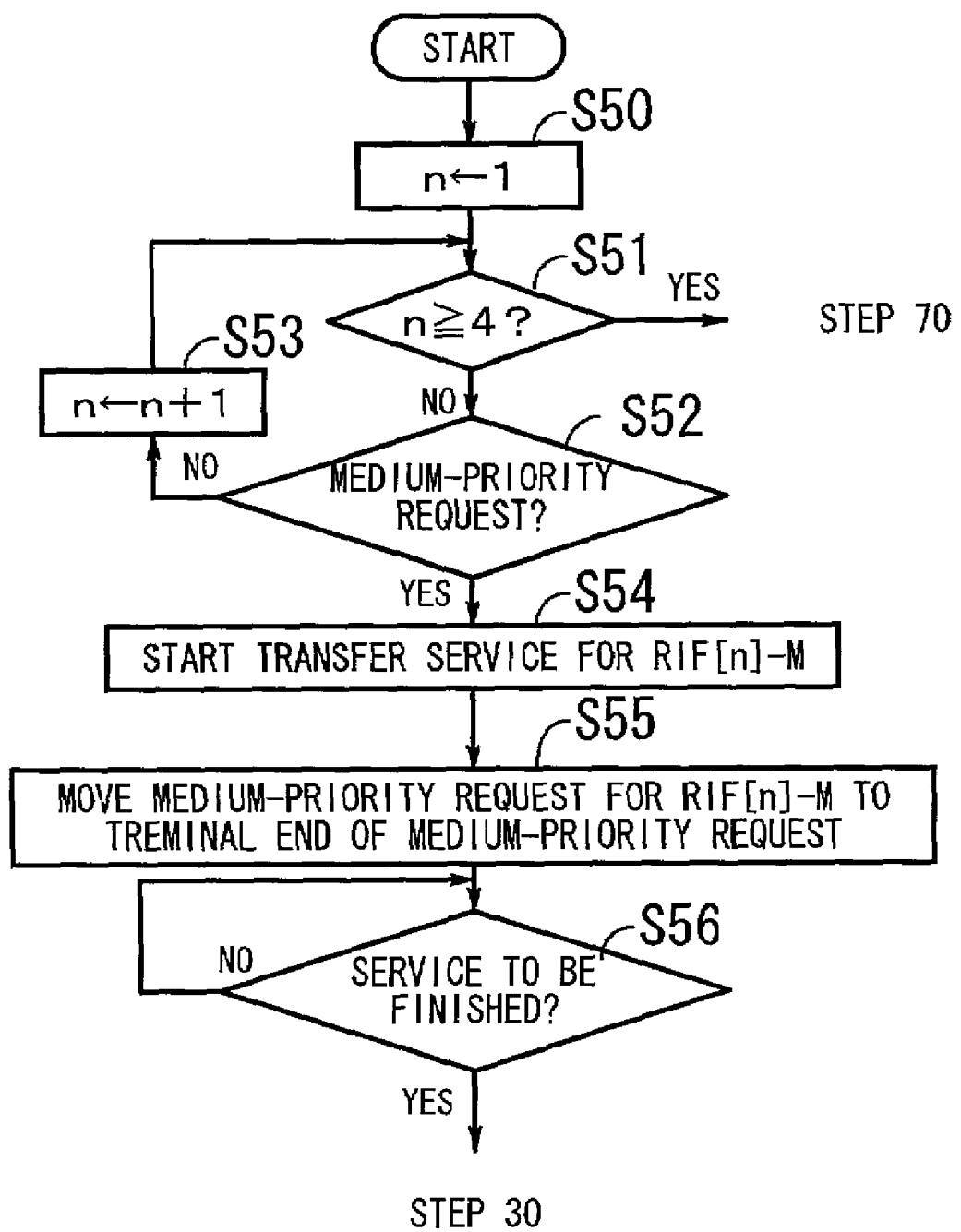
FIG. 26 is a flowchart of a processing sequence which is carried out by the packet transfer device shown in FIG. 17.

FIG. 26 shows a processing sequence for receiving a packet with medium priority. When the processing sequence shown in FIG. 26 is executed, the following steps are carried out.

Step S50:

The service table 71*b* places "1" in the variable n.

Step S51:

The service table 71*b* determines whether or not the value of the variable n is equal to or higher than 4. If the value of the variable n is equal to or higher than 4, then control goes to step S70 shown in FIG. 27. Otherwise, control goes to step S52.

Step S52:

The selector 71*d* refers to the reception request from the request collector 71*a*. If the reception request agrees with information registered in the register RIF[1]-M in the service table 71*b*, then control goes to step S54. Otherwise, control goes to step S53.

Step S53:

The service table 71*b* increments the value of the variable n by "1".

Step S54:

The selector 31*d* requests the In-q/De-q unit 72 to start a transfer service of the input/output port corresponding to the contents of the register group RIF[n]-M. As a result, packets start being read from the corresponding processing circuit and stored in the corresponding queue.

Step S55:

The service rotator 71*c* moves the medium-priority request of RIF[n]-M to the tail end of medium-priority requests.

Step S56:

The scheduler 71 determines whether the service is to be finished or not. If the service is to be finished, then control goes back to step S30 to repeat the above process. Otherwise, the processing of step S56 is repeated.

Figure 27:
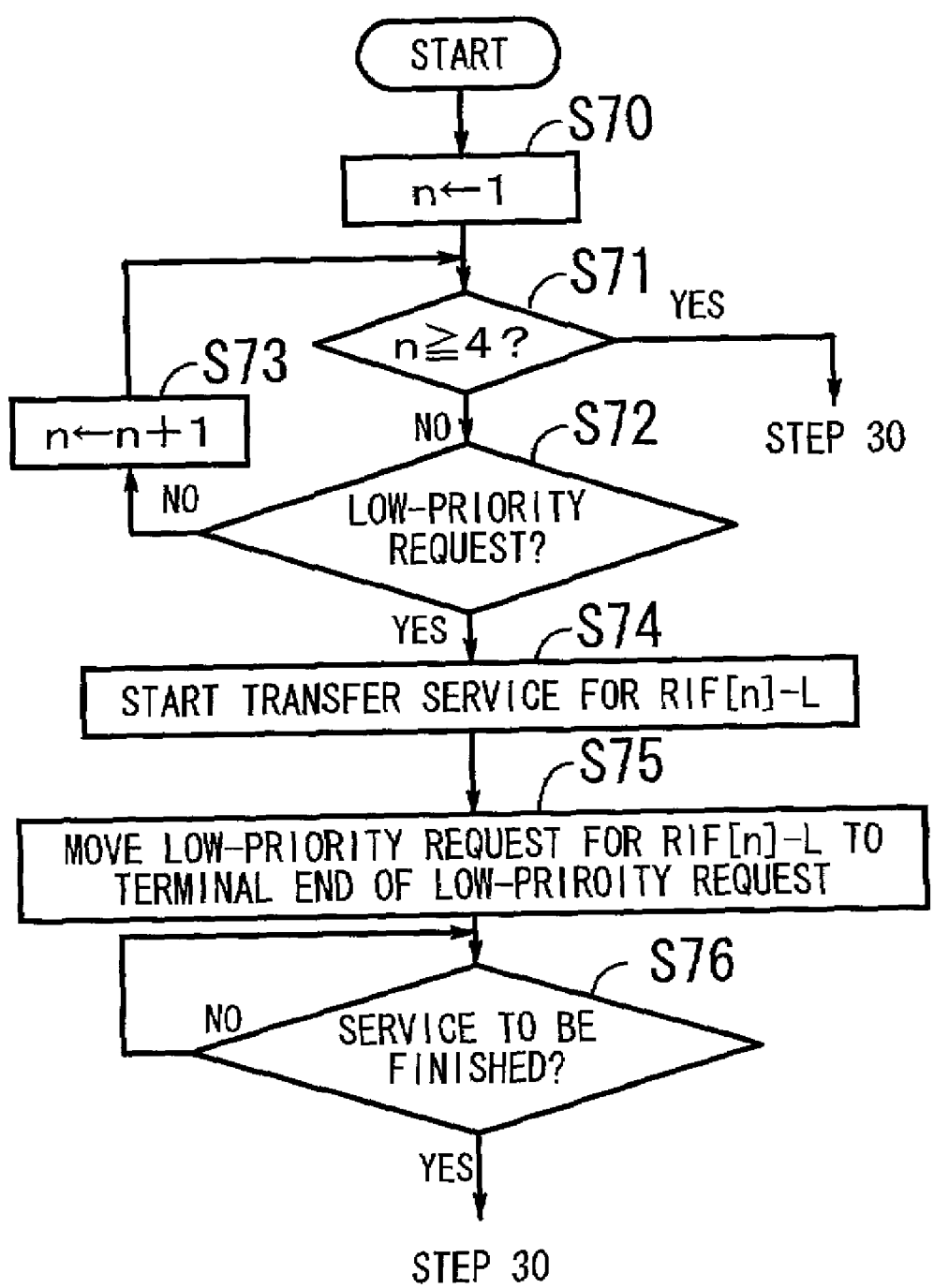
FIG. 27 is a flowchart of a processing sequence which is carried out by the packet transfer device shown in FIG. 17.

FIG. 27 shows a processing sequence for receiving a packet with low priority. When the processing sequence shown in FIG. 27 is executed, the following steps are carried out.

Step S70:

The service table 71*b* places "1" in the variable n.

Step S71:

The service table 71*b* determines whether or not the value of the variable n is equal to or higher than 4. If the value of the variable n is equal to or higher than 4, then control goes to step S30 to wait for a next service request. Otherwise, control goes to step S72.

Step S72:

The selector 71*d* refers to the reception request from the request collector 71*a*. If the reception request agrees with information registered in the register RIF[1]-L in the service table 71*b*, then control goes to step S74. Otherwise, control goes to step S73.

Step S73:

The service table 71*b* increments the value of the variable n by "1".

Step S74:

The selector 71*d* requests the In-q/De-q unit 72 to start a transfer service of the input/output port corresponding to the contents of the register group RIF[n]-L. As a result, packets start being read from the corresponding processing circuit and stored in the corresponding queue.

Step S75:

The service rotator 71*c* moves the low-priority request of RIF[n]-L to the tail end of low-priority requests.

Step S76:

The scheduler 71 determines whether the service is to be finished or not. If the service is to be finished, then control goes back to step S30 to repeat the above process. Otherwise, the processing of step S76 is repeated.

According to the above process, it is possible to process reception requests for packets.

While the processing of reception requests has been described above, transmission requests can be processed in basically the same manner as described above.

Modifications of the above embodiments will be described below.

In the above embodiments, MAC addresses are not registered in the reference tables. However, MAC addresses may be registered in the reference tables. According to such a modification, when a MAC address belonging to a home or a SOHO is inputted from the Internet, it may be filtered out to prevent a third party from making an entry by way of impersonation using a MAC address that has leaked out.

If reception port information can also be referred to, then it is possible to provide security against an attack based on impersonation from a WAN using a private address.

Furthermore, a SYN or ACK flag in a TCP header may be added to the reference table to identify a packet which attempts to make a connection from an external source to a terminal in a home or a SOHO, and a packet with such a flag may be filtered out.

The layer 2 switch 10 shown in FIG. 3 may be designed as an integrated circuit and constructed as a semiconductor device. In such a modification, the CPU 20 may be mounted on the same chip as the layer 2 switch 10, or may be mounted on a chip separate from the layer 2 switch 10.

In the embodiment shown in FIG. 17, register groups are provided and searched in the order from higher-order register groups to give priority to packets. However, priority may be given to packets by setting the number of reading cycles to a higher value for queues of high priority and setting the number of reading cycles to a lower value for queues of low priority.

In the above embodiments, the 3rd- and 4th-layer reference tables are separate and independent from each other. However, these reference tables may be merged, and the concatenator and comparator 33*b* may compare 3rd- and 4th-layer information together. With this arrangement, it is possible to reduce the area occupied by the hardware being used.

According to the present invention, as described above, a packet transfer device has a plurality of input/output ports, a header information extracting circuit for extracting header belonging to a 3rd layer (network layer) and higher layers of a network protocol from packets inputted from the respective input/output ports, a table storing header information and control information corresponding to the header information in association with each other, a control information acquiring circuit for acquiring control information corresponding to the header information extracted by the header information extracting circuit from the table, and a processing circuit for processing packets based on the control information acquired by the control information acquiring circuit. Therefore, communication policy details can be set for each packet and each input/output port, making it possible to construct a system which is flexible.

According to the present invention, a semiconductor device has a plurality of input/output ports, a header information extracting circuit for extracting header belonging to a 3rd layer (network layer) and higher layers of a network protocol from packets inputted from the respective input/output ports, a table storing header information and control information corresponding to the header information in association with each other, a control information acquiring circuit for acquiring control information corresponding to the header information extracted by the header information extracting circuit from the table, and a processing circuit for processing packets based on the control information acquired by the control information acquiring circuit. Therefore, the processing speed of the semiconductor device as a whole can be increased by reducing the burden imposed on a CPU.

According to the present invention, there is provided a packet transfer system for transferring packets between a plurality of networks connected by a packet transfer device, the packet transfer device having a plurality of input/output ports, a header information extracting circuit for extracting header belonging to a 3rd layer (network layer) and higher layers of a network protocol from packets inputted from the respective input/output ports, a table storing header information and control information corresponding to the header information in association with each other, a control information acquiring circuit for acquiring control information corresponding to the header information extracted by the header information extracting circuit from the table, and a processing circuit for processing packets based on the control information acquired by the control information acquiring circuit. Therefore, communication policy details can be set for each packet and each input/output port, making it possible to construct a system which is flexible.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A packet transfer device comprising:
   a plurality of input/output ports;
   a header information extracting circuit for extracting header information belonging to a third layer and a higher layer of a network protocol from a packet inputted from the respective input/output ports;
   a table storing header information and control information corresponding to the header information in association with each other;
   a control information acquiring circuit for acquiring the control information corresponding to the header information extracted by said header information extracting circuit from the table;
   a processing circuit for processing packets based on the control information acquired by said control information acquiring circuit; and
   a process determining circuit for determining a process to be actually performed by said processing circuit if the control information is acquired from a plurality of tables with respect to one packet by said control information acquiring circuit;
   where the control information represents either one of said input/output ports from which the packet is output, and said process determining circuit outputs the packet from the input/output port represented by the control information acquired from the table containing header information belonging to the higher layer.

2. A packet transfer device according to claim 1, wherein said control information represents whether a filtering process is to be effected on the packet or not, and said processing circuit discards the packet if said control information indicates that the filtering process is to be effected on the packet.

3. A packet transfer device according to claim 2, further comprising an input/output port connected to an external network, wherein said processing circuit filters the packet inputted from the input/output port connected to the external network if the packet has address information of an internal unit thereof.

4. A packet transfer device according to claim 1, wherein said control information represents either one of said input/output ports from which to output the packet, and said processing circuit outputs the packet from the input/output port represented by said control information.

5. A packet transfer device according to claim 1, wherein said table stores a plurality of items of header information belonging to different layers and control information corresponding to the items of header information.

6. A packet transfer device according to claim 1, further comprising a plurality of tables storing different items of information.

7. A packet transfer device according to claim 1, wherein said control information represents whether a filtering process is to be effected on the packet or not, and said process determining circuit discards the packet if the items of control information are acquired from said tables and either one of the acquired items of control information indicates that the filtering process is to be effected on the packet.

8. A packet transfer device according to claim 1, wherein said control information includes information representing either one of said input/output ports from which to output the packet and information representing whether a filtering process is to be effected on the packet or not, and said process determining circuit discards the packet if both the information representing either one of said input/output ports from which to output the packet and the information representing whether the filtering process is to be effected on the packet or not are acquired from said tables.

9. A packet transfer device according to claim 1, further comprising a routing processing circuit for performing a routing process.

10. A packet transfer device according to claim 1, further comprising a table rewriting circuit for rewriting the information stored in said table.

11. A packet transfer device according to claim 1, wherein said control information represents a priority of the packet, and said processing circuit processes the packet according to the priority represented by said control information.

12. A packet transfer device according to claim 11, further comprising a storage circuit for temporarily storing the packet, wherein said processing circuit writes, reads, and transmits the packet stored in said storage circuit based on the priority of the packet.

13. A packet transfer system for transferring packets between a plurality of networks connected by a packet transfer device, said packet transfer device comprising:
   a plurality of input/output ports;
   a header information extracting circuit for extracting header information belonging to a third layer and a higher layer of a network protocol from packets inputted from the respective input/output ports;
   a table storing header information and control information corresponding to the header information in association with each other;
   a control information acquiring circuit for acquiring the control information corresponding to the header information extracted by said header information extracting circuit from the table;
   a processing circuit for processing packets based on the control information acquired by said control information acquiring circuit; and
   a process determining circuit for determining a process to be actually performed by said processing circuit if the control information is acquired from a plurality of tables with respect to one of the packets by said control information acquiring circuit;
   where the control information represents either one of said plurality of input/output ports from which the packets are outputted, and said process determining circuit outputs the packets from one of said plurality of input/output ports represented by the control information acquired from the table containing header information belonging to the higher layer.

* * * * *